Jan. 16, 1962     M. V. SCOZZAFAVA ET AL     3,017,081
SALES TRANSACTION REGISTERING APPARATUS

Filed Sept. 6, 1957                        15 Sheets-Sheet 1

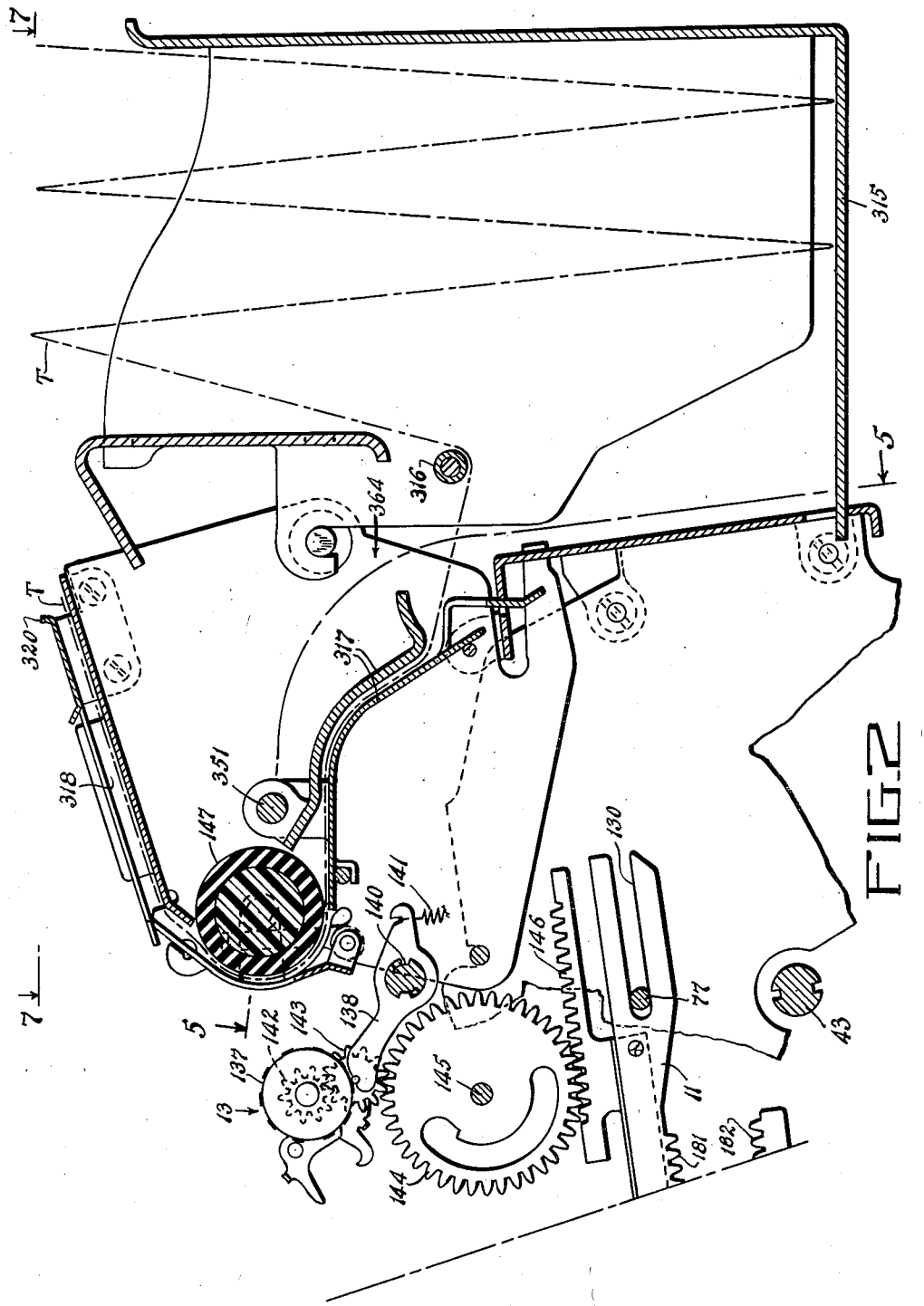

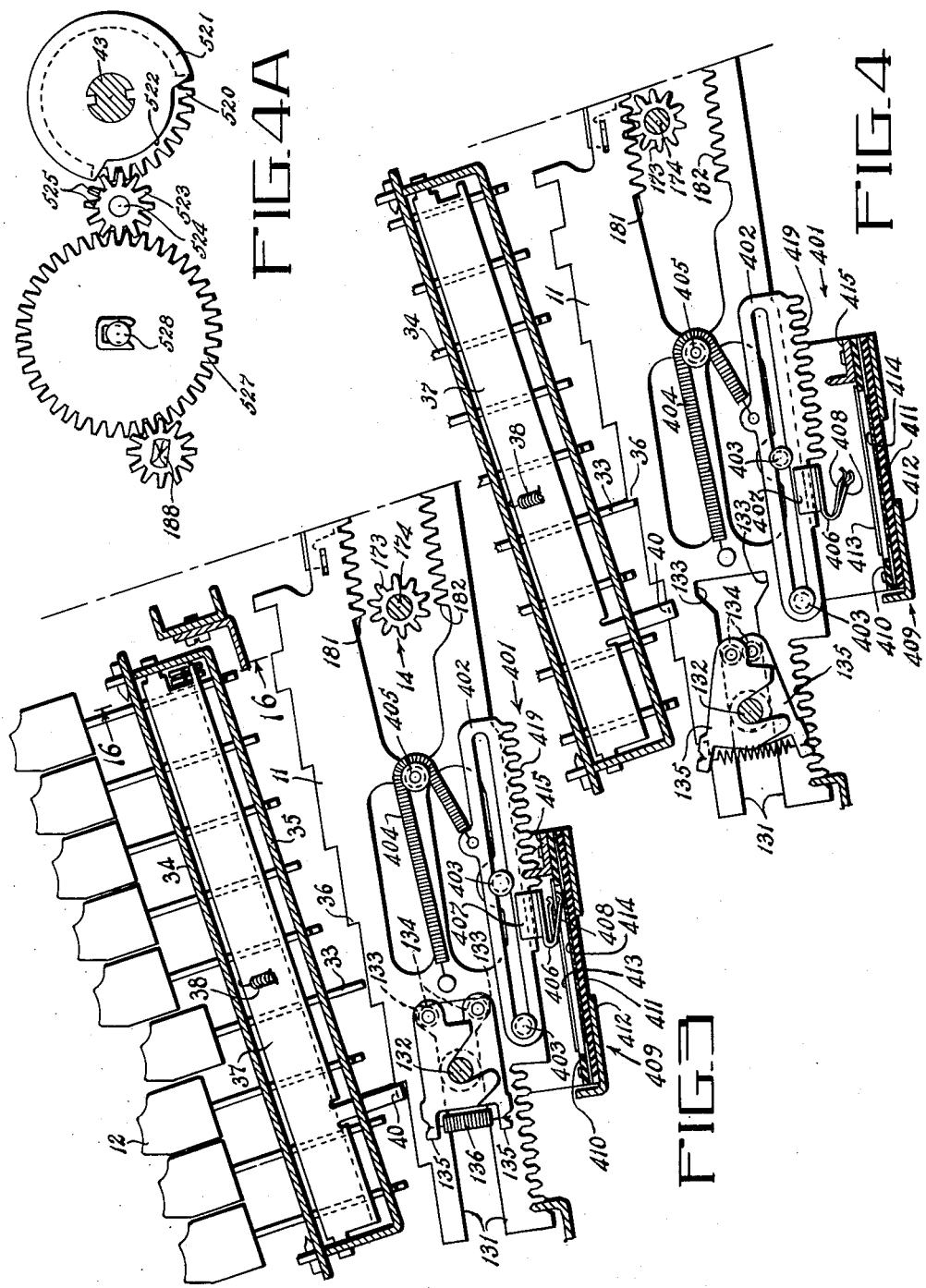

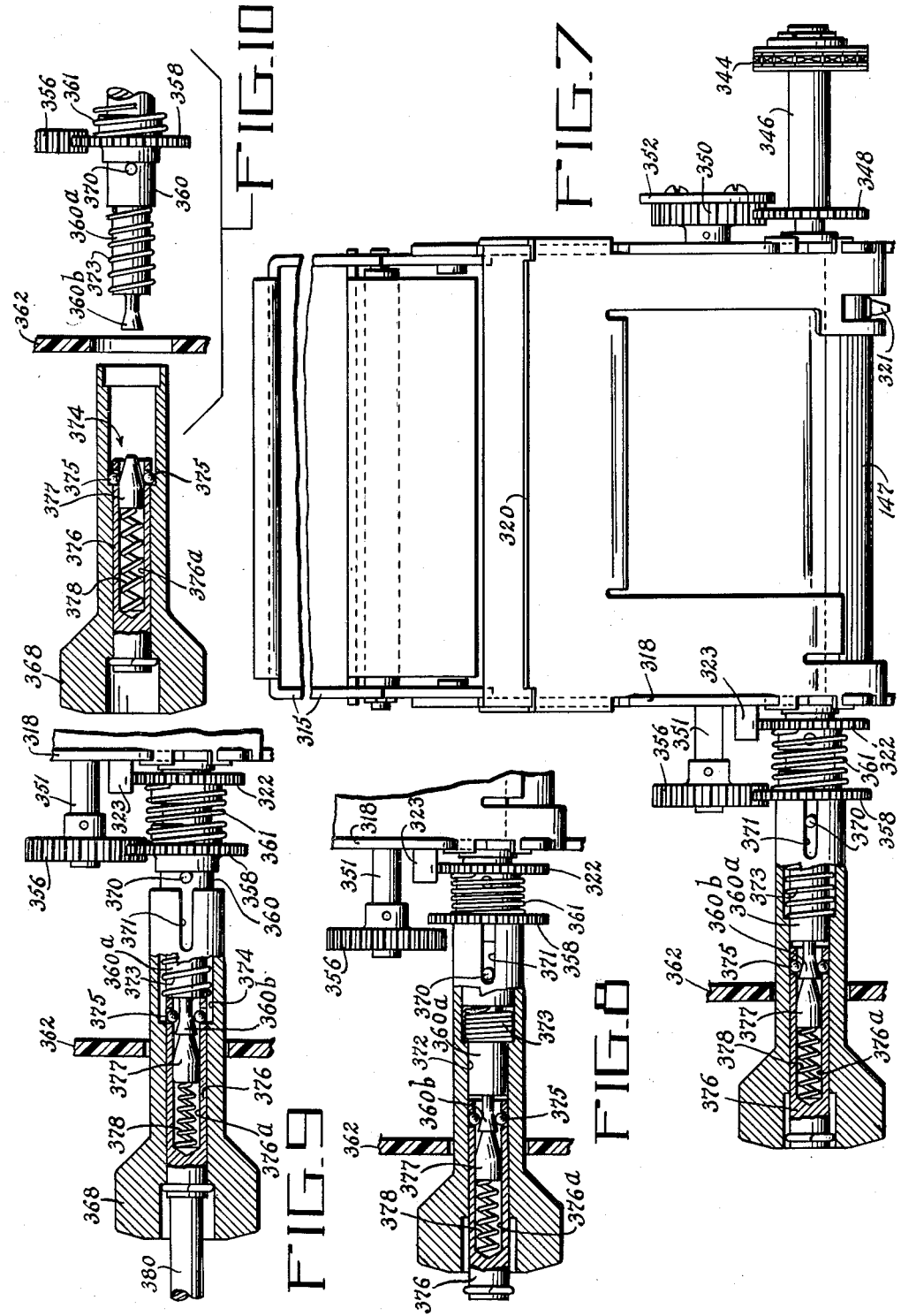

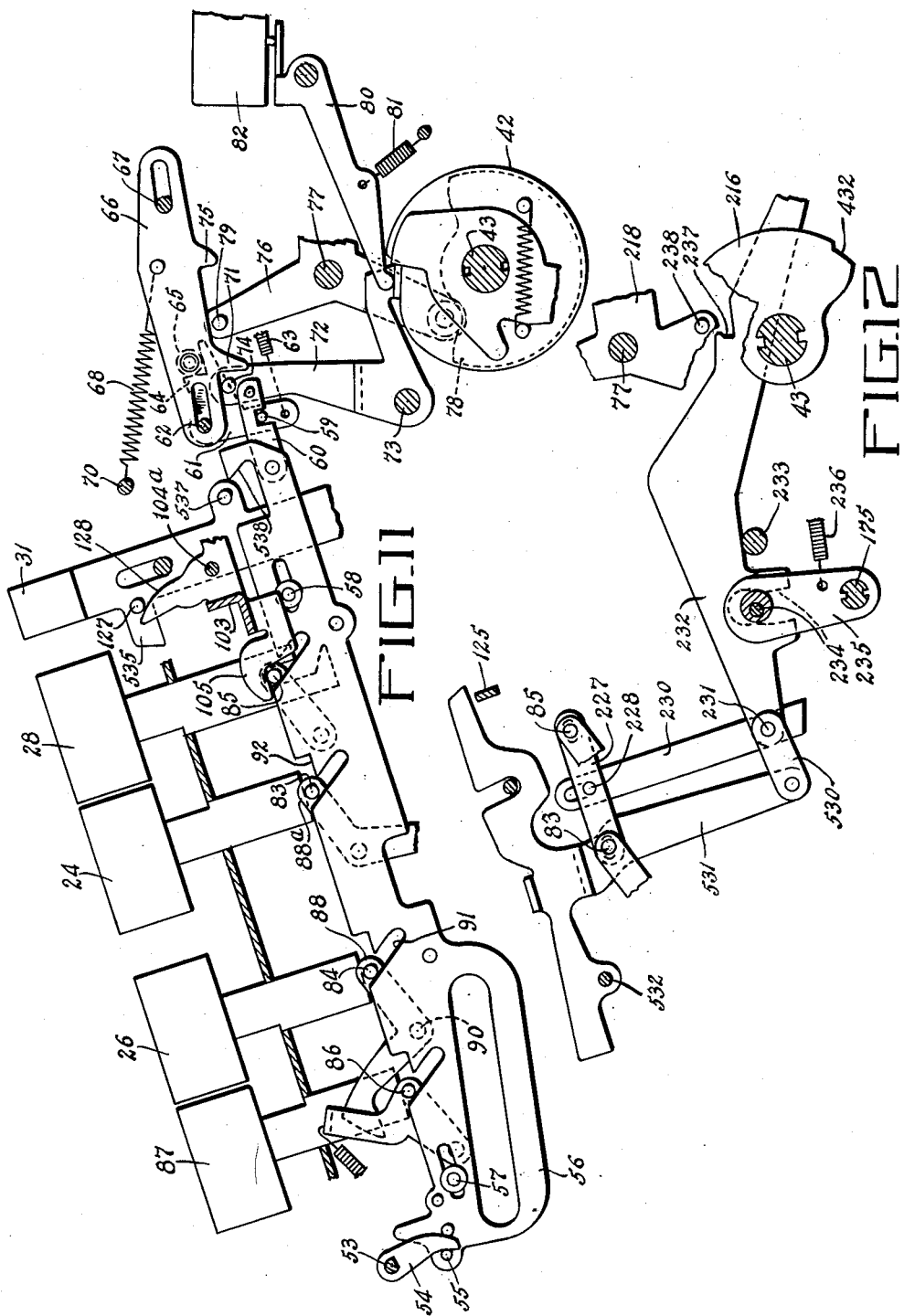

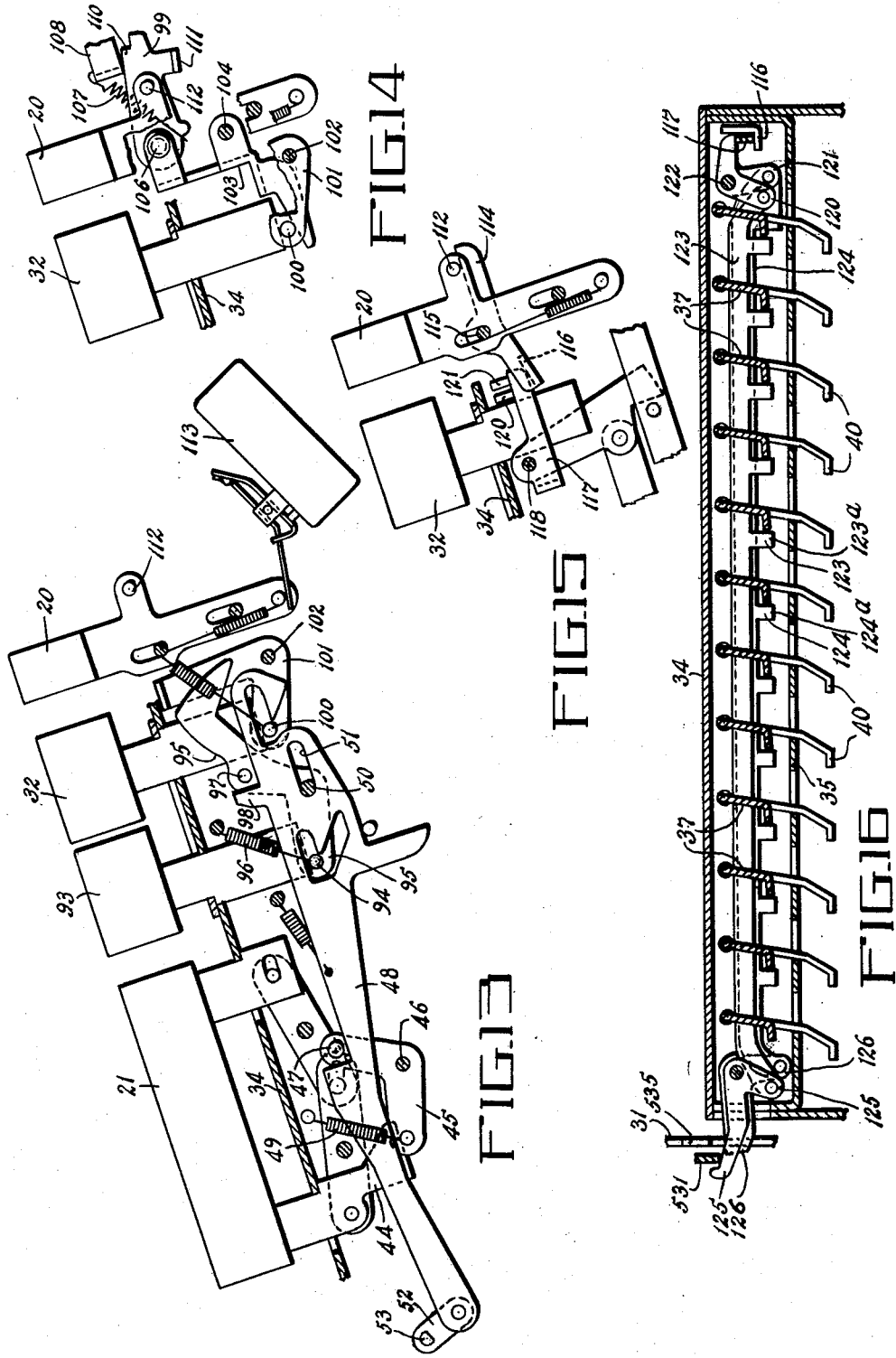

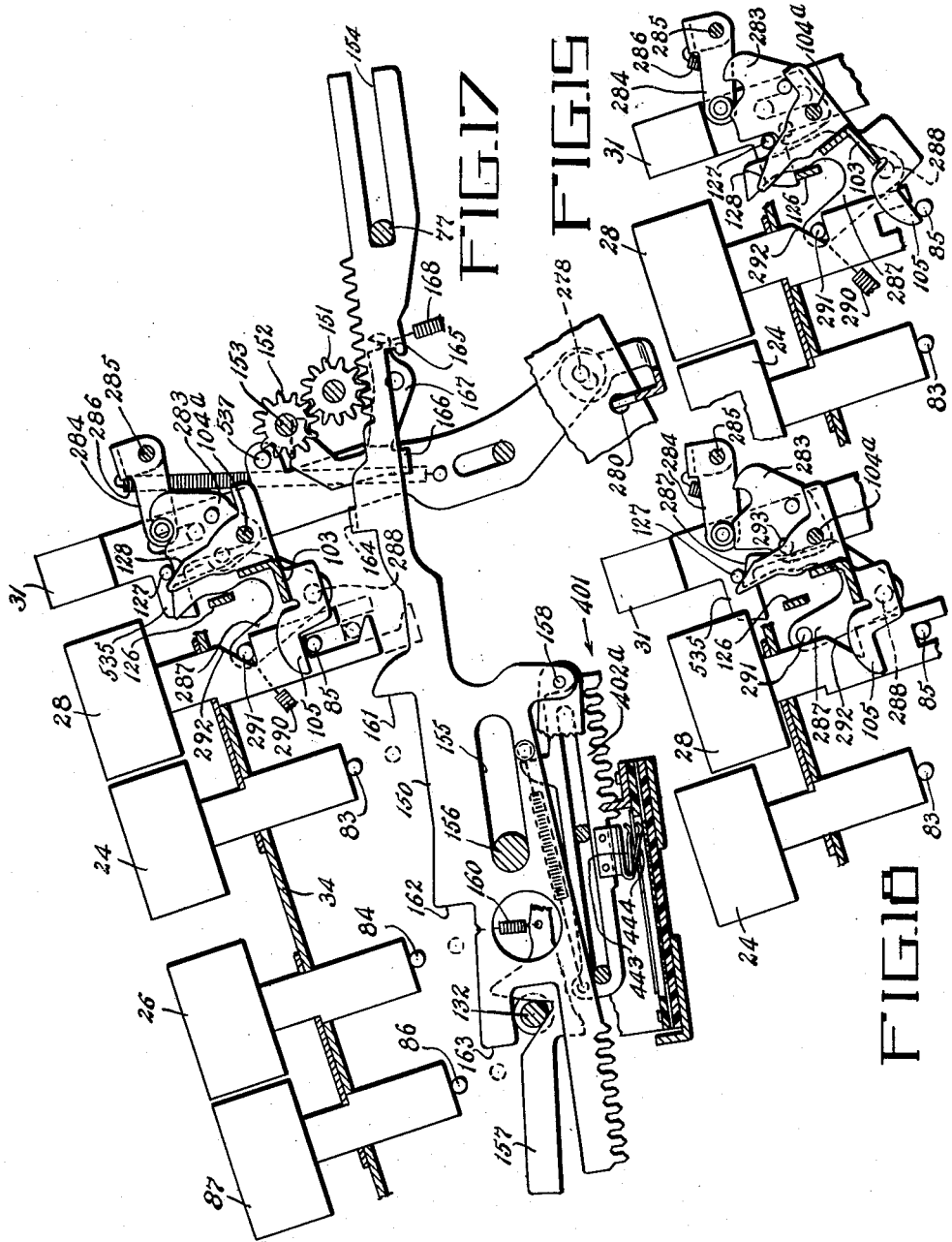

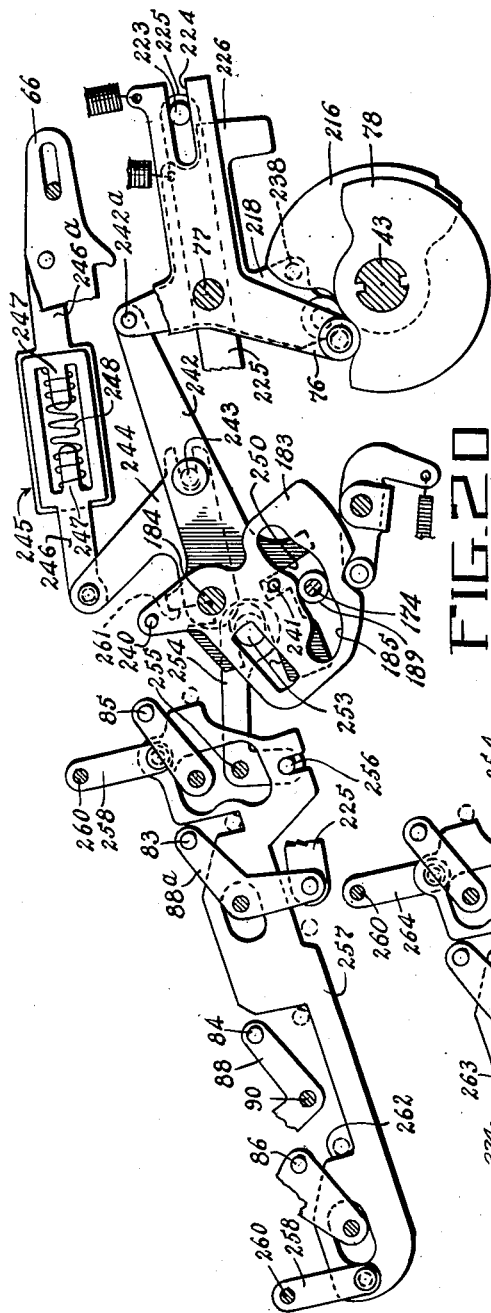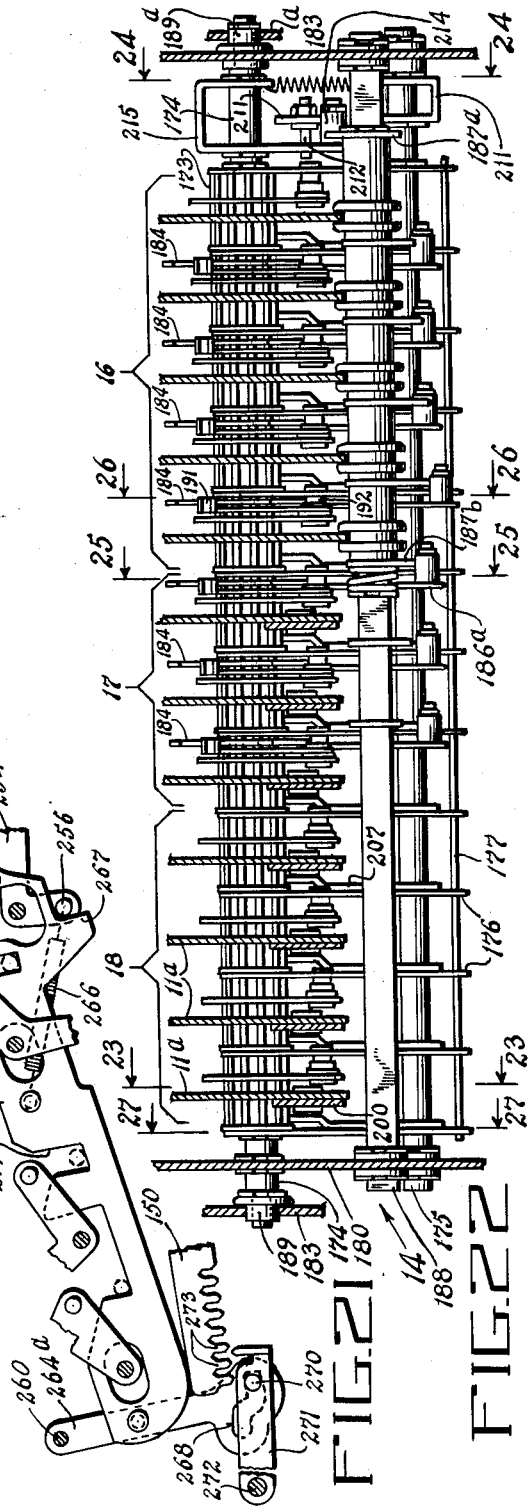

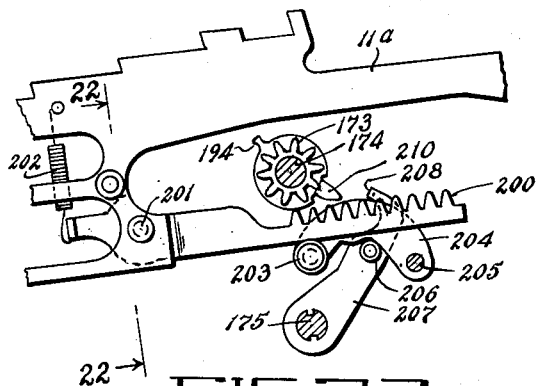
FIG.23  FIG.24
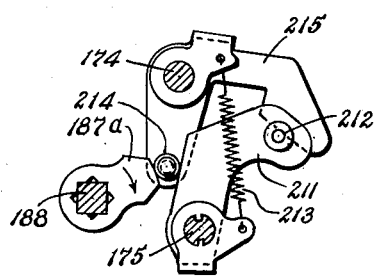
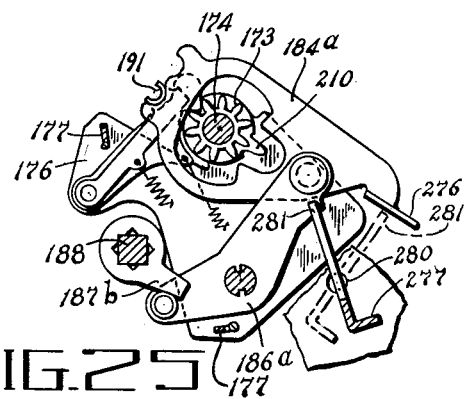
FIG.25  FIG.26
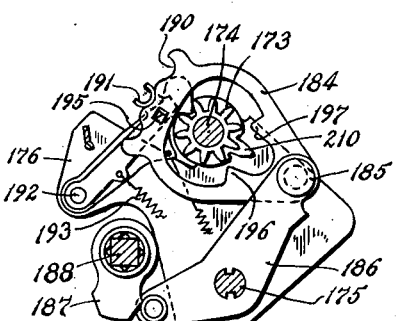
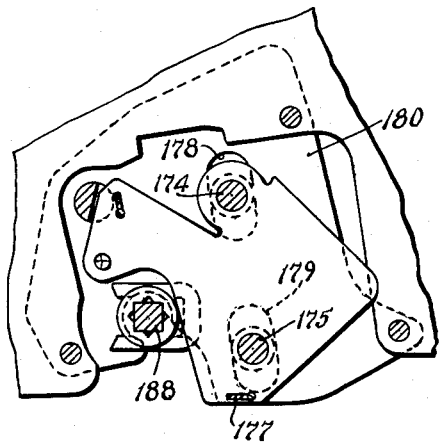
FIG.27  FIG.37
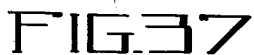

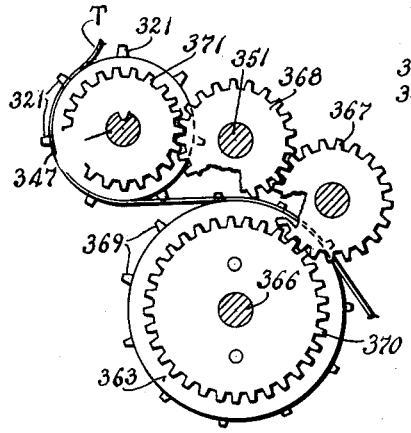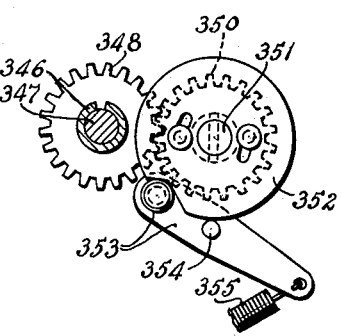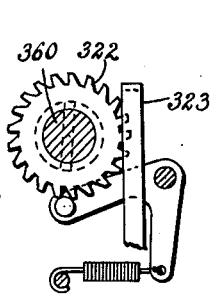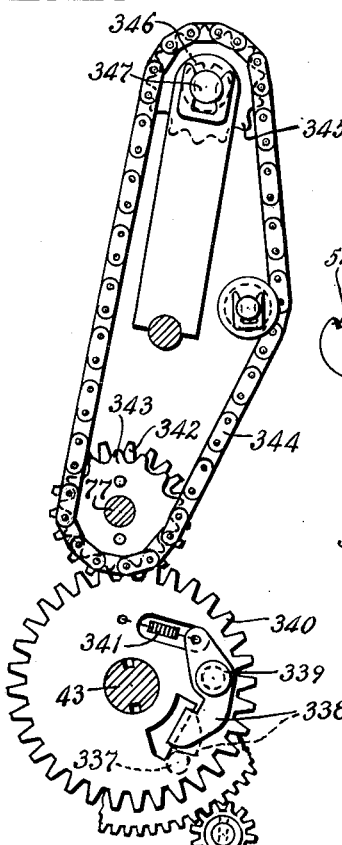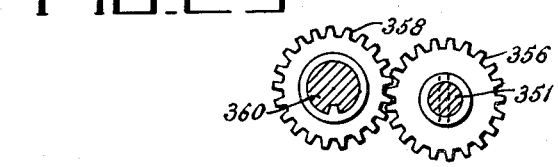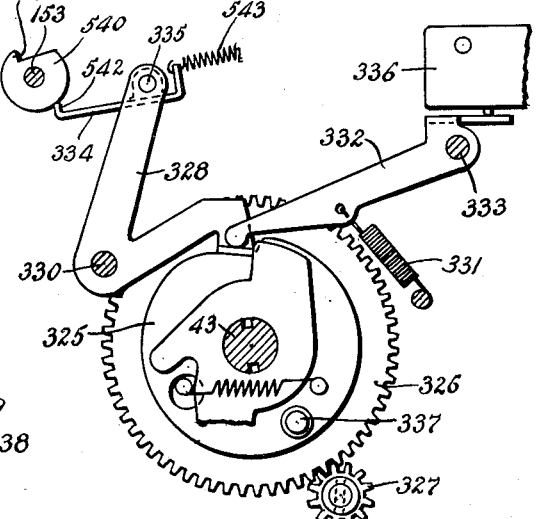

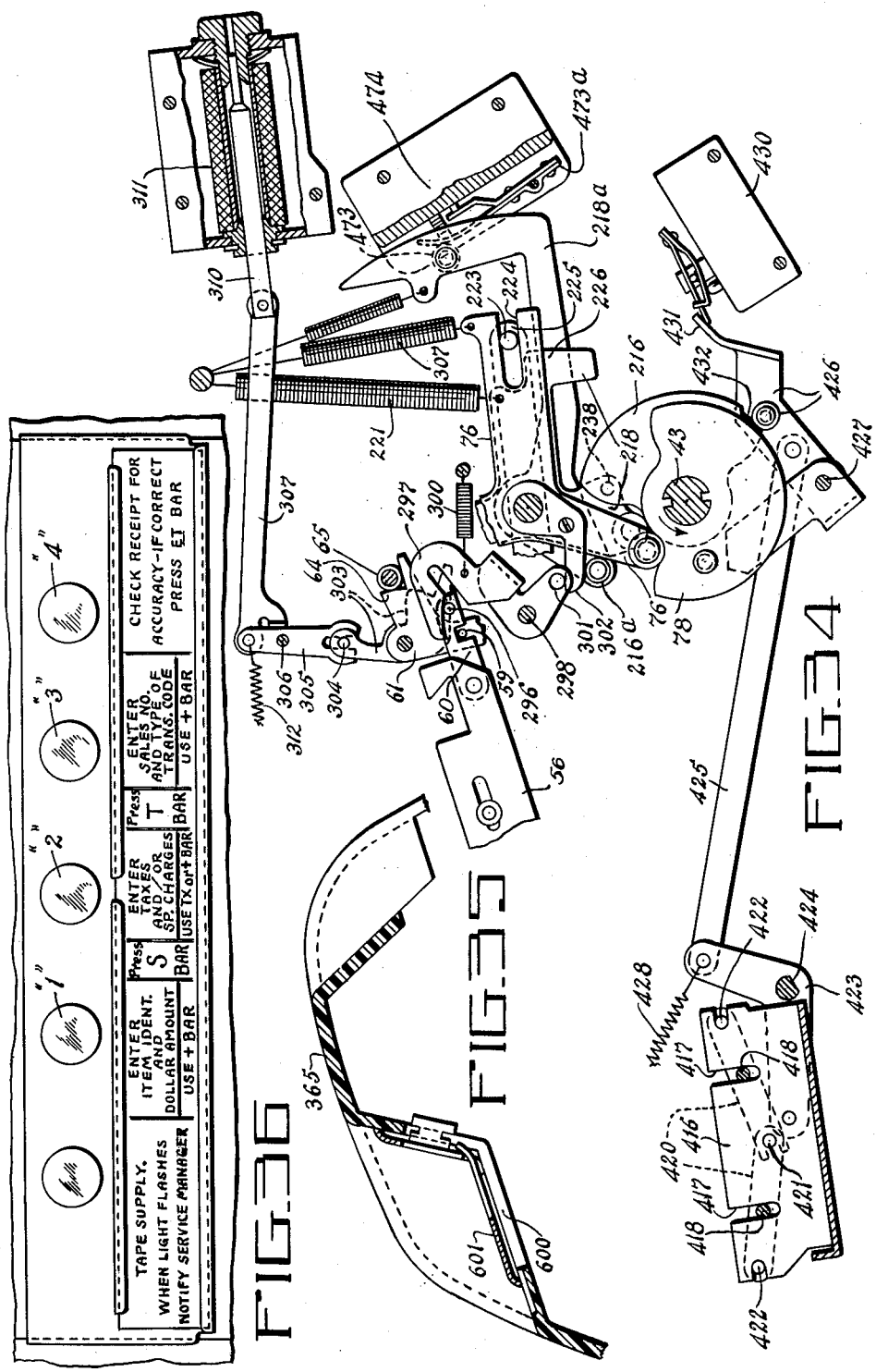

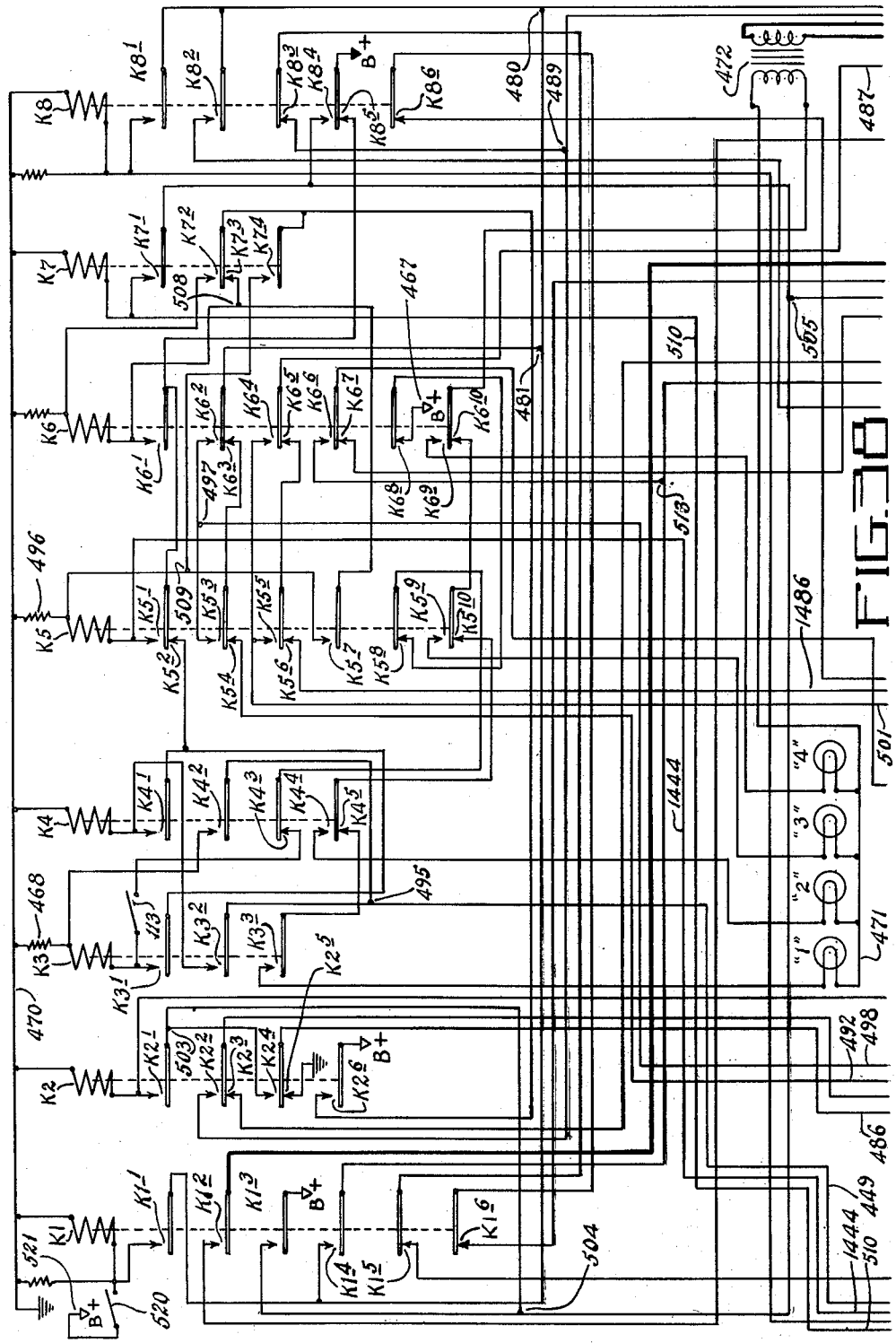

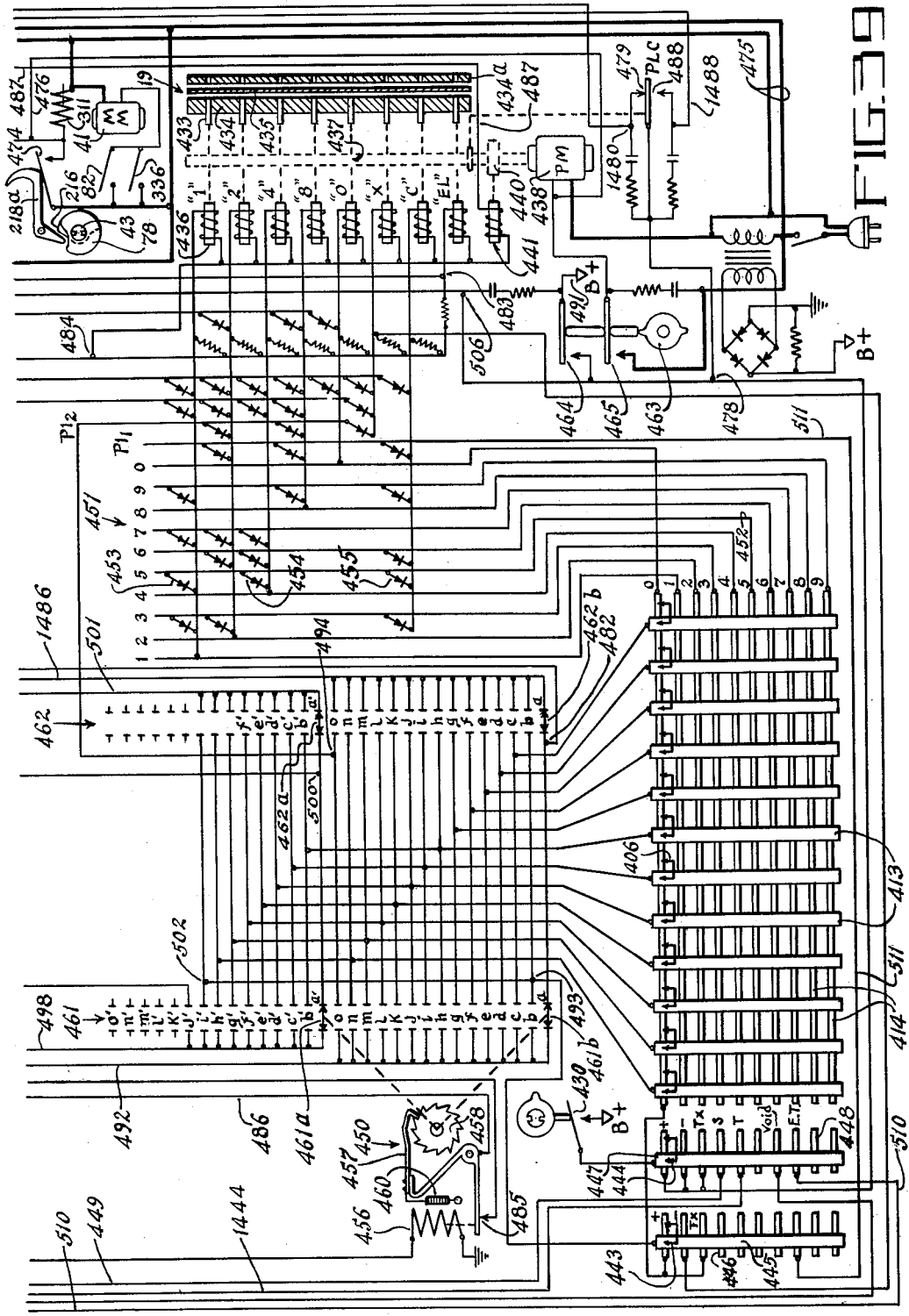

United States Patent Office 3,017,081
Patented Jan. 16, 1962

3,017,081
SALES TRANSACTION REGISTERING APPARATUS
Milton V. Scozzafava, Arcadia, John K. Linn, Los Angeles, and Richard E. Busch, La Puente, Calif., and Robert E. Boyden, Granby, Conn., assignors to Clary Corporation, San Gabriel, Calif., a corporation of California
Filed Sept. 6, 1957, Ser. No. 682,551
8 Claims. (Cl. 235—60.31)

This invention relates to sales transaction registering apparatus and has particular reference to point-of-sale registering equipment.

Heretofore, stores and other business transaction establishments have generally utilized cash registers to keep a record of the amount of money involved in sales transactions and to issue receipts of such transactions. The clerk identification number and possibly other identification matter was entered in the register and recorded on a printed record along with the amount of money involved in the transaction. The sales person also generally recorded a more detailed record in a sales book, pertaining to each sale, such as his identification number, department number, type or class of merchandise, price of the merchandise, tax, etc.

Later, the cash register record and the sales book record were forwarded to an accounting department where the records were correlated and were processed to compile statistics for inventory control, payroll, taxes, and other purposes. Also, statements were prepared from the sales book entries in the case of charge transactions.

The above procedure, although generally satisfactory, usually required considerable duplication in work in entering data in the cash register and in the sales book entries. Further, the correlation of the various records and additional handling of the same by the accounting department further increased the amount of clerical work and tended to introduce errors.

Accordingly, a principal object of the present invention is to reduce the amount of work involved in recording records of sales transactions.

Another object is to reduce duplication of work on the part of a sales person and cashier in recording a sales transaction.

Another object is to reduce the possibility of error in making a record of a sales transaction.

Another object is to reduce the time necessary to make and record a sales transaction.

Another object is to enable the use of preprinted forms in a sales transaction registering machine in which records of sales transactions are made.

The manner in which the above and other objects of the invention are accomplished will be readily understood on reference to the following specification when read in conjunction with the accompanying drawings, wherein:

FIG. 2 is a longitudinal sectional view through the rear portion of the machine and is taken along line 2—2 of FIG. 1.

FIG. 3 is a longitudinal sectional view through the forward portion of the machine and is taken along line 3—3 of FIG. 1.

FIG. 4 is a view similar to FIG. 3 but illustrating the mechanism partly through a machine cycle.

FIG. 4A is a side view of the tens transfer shaft drive mechanism.

FIG. 7 is a plan view, partly in section, illustrating the paper supply mechanism.

FIGS. 8, 9 and 10 are fragmentary views of the paper feeding knob and connections in their various different positions, distinguished from the position illustrated in FIG. 7.

FIG. 11 is a sectional elevation view of the primary clutch and some of its controls.

FIG. 12 is a sectional elevation view of the controls for rocking the accumulator zero stop shaft and also for clearing the amount sections of the keyboard.

FIG. 13 is a sectional elevation view of certain of the machine control bars.

FIG. 14 is a sectional elevation view of the latch associated with the void and start control bars.

FIG. 15 is a fragmentary elevation view of the linkage for clearing the entire keyboard under control of the start key.

FIG. 16 is a sectional elevation view of a portion of the key release mechanism and is taken along line 16—16 of FIG. 3.

FIG. 17 is a sectional elevation view of the symbol rack and associated controls.

FIG. 18 is a view of certain parts shown in FIG. 17 in positions effected by depression of the total bar.

FIG. 19 is a view of the parts shown in FIG. 18 in positions effected by depression of the end transaction key.

FIG. 20 is a sectional elevation view of the accumulator positioning control mechanism.

FIG. 21 is a sectional elevation view of the symbol rack control lock.

FIG. 22 is an elevational view of the accumulator and is taken substantially along lines 22—22 of FIG. 23.

FIGS. 23, 24, 25, 26 and 27 are transverse sectional views through different portions of the accumulator and are taken respectively along lines 23—23, 24—24, 25—25, 26—26 and 27—27 of FIG. 22.

Figure 5:
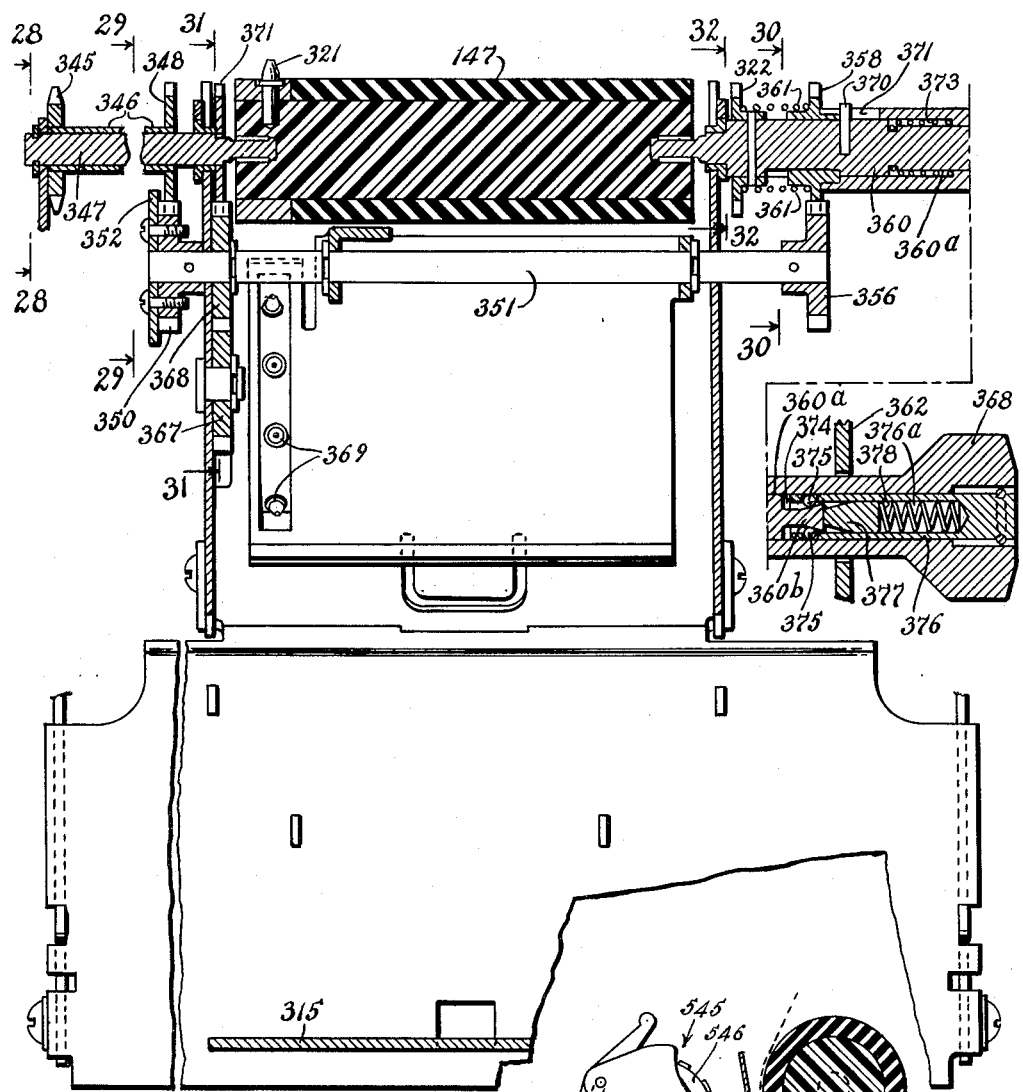
FIG. 5 is a transverse sectional view taken substantially along line 5—5 of FIG. 2.

FIGS. 28, 29, 30, 31 and 32 are sectional views taken respectively along lines 28—28, 29—29, 30—30, 31—31 and 32—32 of FIG. 5, illustrating the paper feeding mechanism.

FIG. 33 is a sectional elevation view of the auxiliary feed clutch for controlling the paper feed.

FIG. 34 is a sectional elevation view of the linkage and controls associated with electrical components which are electrically connected to the tape punch.

Figure 1:
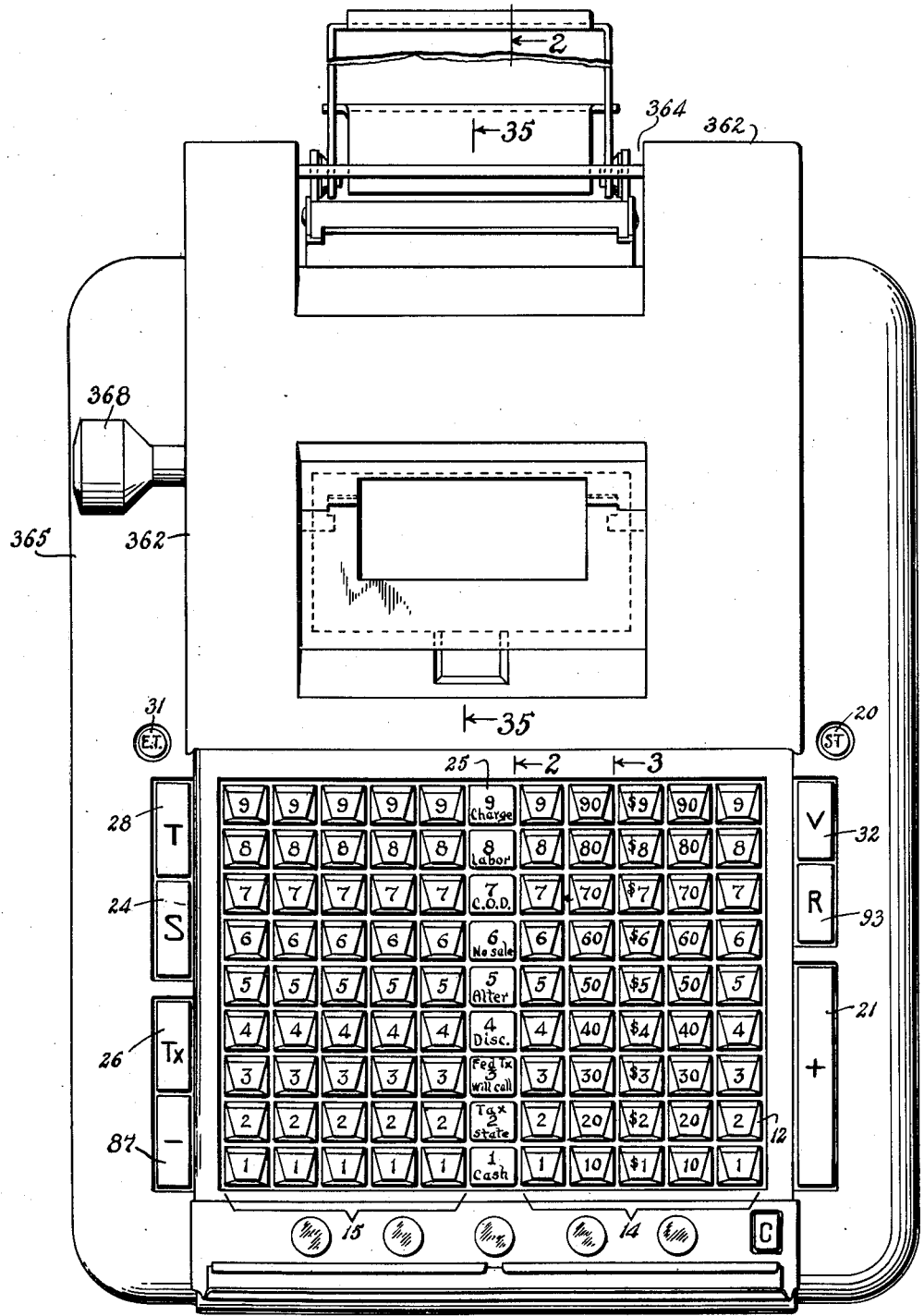
FIG. 1 is a plan view of a machine embodying the present invention.

FIG. 35 is a sectional view taken along line 35—35 of FIG. 1 and illustrating the hinged closure for an opening in the machine cover.

FIG. 36 is a developed view of an order-of-operation chart suitably secured to the cover of the machine.

FIG. 37 is a facsimile of a sales check produced by the machine.

FIGS. 38 and 39 when combined present a schematic view of the circuitry associated with the tape punch.

Figure 40:
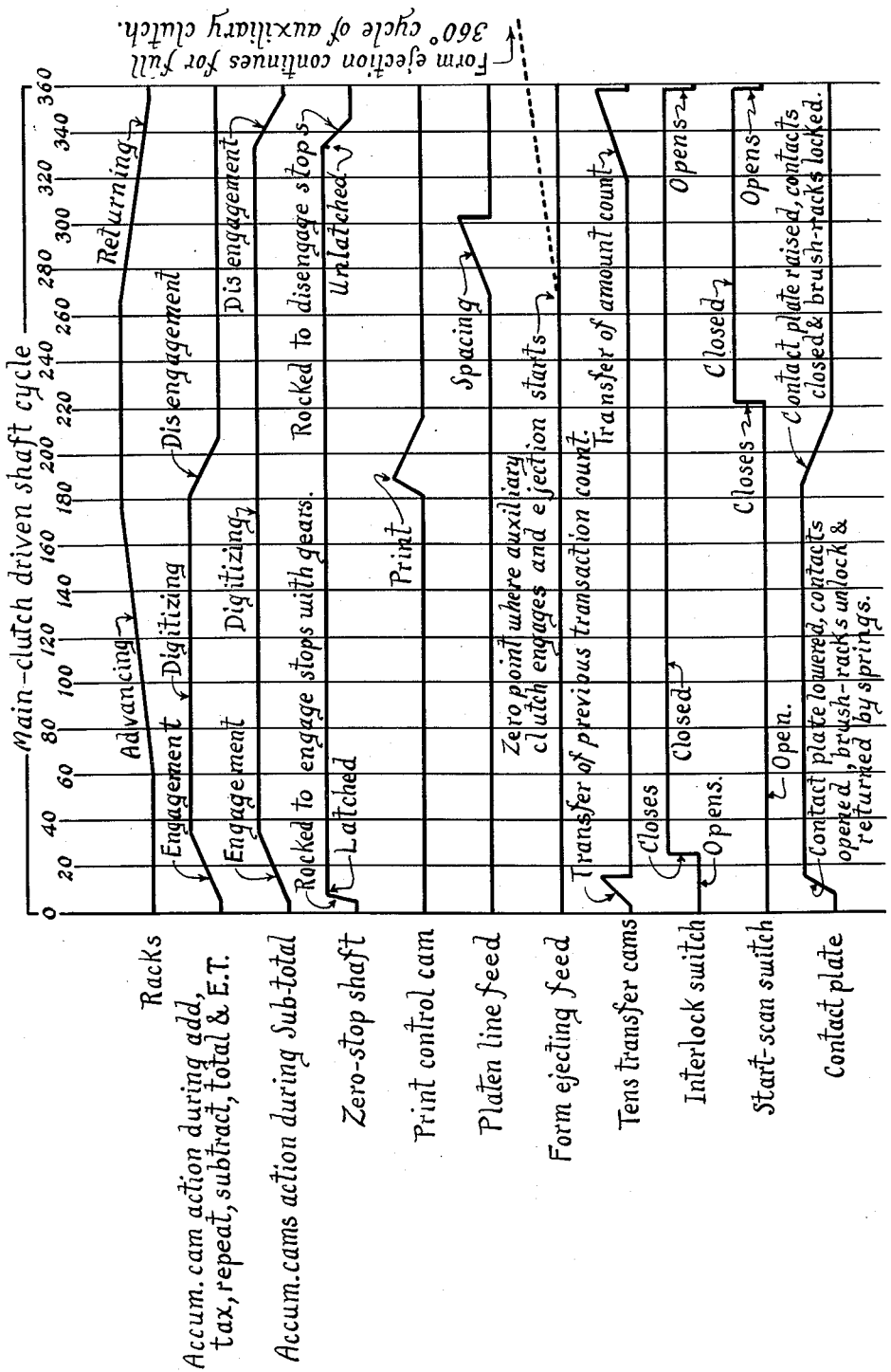

FIG. 40 is a timing chart illustrating the relative timing operations of certain parts of the apparatus.

The sales transaction machine shown generally in FIG. 1 embodies mechanism which is basically similar to that found in the well-known Clary adding machine and reference is therefore made to the R. E. Boyden Patent No. 2,583,810 issued on January 29, 1952, and the E. P. Drake Patent No. 2,472,696, issued on June 7, 1949, for details of the basic Clary adding machine. Accordingly, only those portions of such mechanism which relate to or form part of the present apparatus will be described in detail herein.

The machine is of the full keyboard, rack driven type and comprises a plurality of denominationally arranged differential actuator racks 11 (FIGS. 2 and 3), each differentially controlled by a row of nine amount keys 12. The racks are operatively associated with respective orders of a printer section generally indicated at 13 (FIG. 2) and with an accumulator section generally indicated at 14 (FIG. 3).

The keyboard is divided into two sections, the right hand section 14 including five rows of amount keys for entering the monetary amount of a sales transaction, the keys in each row ranging progressively in digital value from 1 to 9. The left hand section 15 of the keyboard includes six rows of keys for the purpose of entering various identification matter pertaining to the sales transaction.

The accumulator 14 (see also FIG. 22) is divided into three sections 16, 17 and 18. The section 16 cooperates with the actuator racks associated with the amount keys in the right hand section 14. The accumulator sections 17 and 18 cooperate with the racks associated with the keys in the left hand section 15. Although the accumulator sections 17 and 18 cooperate with the racks for the key sections 15, amounts are never entered therein, but are only subtotaled out of such accumulator sections at certain times. In this respect, the center accumulator section 17 forms a transaction counter which advances once per transaction, the transaction number being subtotaled from this section and printed during each transaction operation.

Likewise, the accumulator section 18 is preset as will be described later to certain numerical positions for identifying the machine number and the section number, and are subtotaled by respective racks during certain cycles of each transaction.

Describing first the general operation of the machine in effecting a sales transaction, a start key 20 (FIGS. 1, 13, 14 and 15), which forms part of a machine conditioning device, is first depressed. The latter conditions the machine and an associated tape punch for operation and releases any amount keys which may have been previously inadvertently or otherwise depressed. Thereafter, the amount of an item and the identification or catalog number of such item involved in the transaction are entered into the key sections 14 and 15, respectively. An add bar 21 is then depressed causing operation of the machine to print such information on a preprinted form 22 (FIG. 37), as indicated on line 23 of the form. This information is also punched in coded form in the paper tape punch diagrammatically indicated at 19 (FIG. 39). The form is automatically advanced and any number of additional items may likewise be entered and recorded. During each such add operation, the amount of the item is accumulated in the accumulator section 16.

After all items of a particular sales transaction have been entered, a subtotal key 24 is depressed to obtain a total to be used as the basis of computing any taxes required. Thereafter, the amount of tax is entered into the section 14, then one of several keys in a key row 25 is set to indicate the type of tax, and the tax bar 26 is depressed, entering the amount of taxes in the accumulator section 16 and recording the same as indicated in line 27 of FIG. 37. This information is also punched in the paper tape. Different types of taxes may be entered on successive lines. A total key 28 is then depressed to obtain a total of the amount due in the transaction. This amount is printed in a line 29 following the last tax or special charge entry.

Thereafter, a code representing the type of transaction, i.e., cash, charge, C.O.D., etc., is entered in the row of keys 25 and the sales person's identification number is entered in one or more of the remaining rows of key section 15. The add bar is again depressed to enter this amount which is recorded, as indicated on line 30, on the receipt form and is punched in coded form in the tape.

Thereafter, an "end-of-transaction" key 31 (forming part of a machine deconditioning device) is depressed which causes a cycle of operation of the machine to automatically record the date (as set in a date section of the printer), machine number, section number and transaction number, as indicated on line 31 on the receipt form. The latter key causes this information to be punched in the tape and disables the machine, requiring reenablement thereof by depression of the start key 20 as an incident to the next sales transaction.

In the event of an erroneous entry of any data in the machine, a void bar 32 may be depressed at any time which clears the accumulator, requiring a new operation to be initiated by depression of the start key 20.

Describing now the construction of the machine, each of the amount keys 12 of the keyboard includes a key stem 33 (FIGS. 3 and 4) guided for vertical movement in aligned slots formed in keyboard frame plates 34 and 35. The lower edges of the key stems cooperate with spaced shoulders 36 formed on the aligned racks 11 to limit the forward advancement of each rack to a number of increments corresponding to the numerical value of the key depressed in the associated row.

Spring means (not shown) are provided for normally holding the keys in their raised positions and means are further provided for latching each key in rack arresting position upon depression thereof. For this purpose, each key has a cam lobe (not shown) which is engageable by locking bail 37, there being one such bail in each row. Each bail is pivoted at its opposite ends to front and rear walls extending upwardly from the key frame plates 35. As a key is depressed, its cam lobe will move past the locking bail and as the lobe passes below the bail, the latter will be retracted partly by a spring 38 to a position wherein it latches the key in rack arresting position.

A zero block 40 depends from each locking bail 37 and, when no key in a row associated with the particular rack is depressed, the bail will locate the zero block in a position directly in front of one of the shoulders 36 thereby preventing forward movement of the rack during a subsequent cycle of the machine. However, when any amount key is depressed and latched down, its locking bail 37 will be held outwardly sufficiently to maintain its zero block out of the path of the aligned rack.

The machine is driven by a motor MM diagrammatically indicated at 41 (FIG. 39) through a cyclic clutch 42 (FIG. 11) having its driving side connected to a rotatable cam shaft 43. The clutch is effective to cause a complete rotation of the shaft 43 in a counterclockwise direction during each cycle of operation.

The machine is controlled to perform different operations by depressing corresponding machine control bars, certain of which have been described heretofore. The add bar 21 (FIG. 13) has two stems thereof slideably mounted in slots in the upper keyboard plate 34, the forward stem 44 thereof overlying a pin on a bell crank 45 which is fulcrummed on a frame pin 46 and is provided with a pin 47 lying directly behind a shoulder on an actuating link 48. The latter is guided at its rear end by a frame pin 50 embraced by elongated slot 51 in the slide. The forward end of the slide is pivotally connected to an arm 52 fastened to a rock shaft 53 (see also FIG. 11) which is suitably pivoted in a manner not shown in the machine frame. Upon depression of the add bar, the bell crank 45 will be rocked counterclockwise against the action of a tension spring 49 causing the slide 48 to rock the shaft 53 clockwise. An arm 54 (FIG. 11) fastened to the shaft 53 engages a pin 55 on a clutch control bar 56, causing the latter to slide forwardly over frame pins 57 and 58, which are embraced by elongated slots in the bar. A hook 60 pivotally attached to the rear end of the bar normally hooks over a pin 59 on a trigger arm 61 to rock the latter clockwise about its fulcrum pin 62 against the action of a spring 63. The arm 61 is provided with a latching shoulder 64 normally lying directly in front of a roller 65 carried by a power slide 66. The latter is provided with elongated slots embracing the pin 62 and a frame pin 67. A relatively strong spring 68 is tensioned between the slide 66 and a frame pin 70 whereupon as the arm 61 is rocked to release the slide, the latter will be advanced sharply to the left in FIG. 11, causing a depending shoulder 71 to engage a pin 74 on a clutch dog 72 which is fulcrummed at 73 and normally held in its illustrated clutch disengaging position relative to the clutch 42 by a light tension spring 81. The clutch dog will thus be removed from engagement with the clutch, enabling the latter to become engaged for a complete cycle.

When the power slide 66 is driven to the left, a shoulder 75 thereon moves adjacent a pin 79 carried on a cam follower 76 (see also FIG. 34). The latter is pivotally mounted on a stationary shaft 77 and is urged counterclockwise by a spring 307 (FIG. 34) against a cam 78 keyed on the shaft 43. Part way through a machine cycle, the cam 78 becomes effective, through the follower 76, to move the slide 66 back to its normal illustrated position wherein it may be relatched by the arm 61, permitting the clutch dog 72 to be returned clockwise by the spring 81 to its normal clutch disengaging position.

The clutch dog 72 is also effective, when rocked counterclockwise to cause engagement of the clutch, to rock a switch control lever 80 against the action of the spring 81 to thereby close a normally open switch 82 in the machine motor circuit.

Pins 83, 84, 85 and 86 underlying the stems of the control bars 24, 26, 28 and a minus control bar 87, respectively, are fixed to individual arms, like arm 88, all pivoted on frame pins, like pin 90, and urged into their upper illustrated positions by individual springs (not shown). It will be noted that the clutch control bar is provided with inclined slots, like slot 91, underlying each of the above pins whereby depression of any of the control bars 24, 26, 28 and 87 will move the control bar to the left to cause engagement of the clutch. It will be noted that when the control bar is moved to the left by depression of one of the above control bars, shoulders, like shoulder 92, thereon will prevent depression of any of the other control bars.

A repeat bar 93 (FIG. 13) is provided to cause repetitive cycles of the machine to repetitively enter an amount set up in the keyboard. For this purpose, the stem of the repeat bar overlies a pin 94 carried on an arm 95 fulcrummed on the frame pin 50 and urged clockwise by a spring 96. When the repeat bar is depressed, the arm 95 is rocked counterclockwise causing a pin 97 thereon to engage a projection 98 on the slide 48, causing the latter to advance to clutch engaging position by rocking the shaft 53.

The stem of the void bar 32 overlies a pin 100 on a bell crank 101 (see also FIG. 14) which is fulcrummed on a frame pin 102. The pin 100 overlies a forwardly extending arm of a bail 103 (FIG. 14) fulcrummed at 104 and extending across the machine where it is provided with a second arm 105 (FIGS. 11, 17, 18 and 19) overlying the pin 85 associated with the total bar 28. Thus, as the void bar 32 is depressed, the bail 103 is rocked counterclockwise to depress pin 85 and thus cause engagement of the clutch in the same manner as does the total bar 28.

The bail 103, when rocked into a counterclockwise position, is maintained in such position and, for this purpose, the bail is provided with a latching tip 99 which is pivoted thereon at 106 and urged upwardly by a spring 107 to engage the under-surface of a part 108 secured to the machine framework. As the bail 103 moved into its counterclockwise rocked position, a latching shoulder 110 on the tip 99 snaps in front of the part 108. In this position, a ledge 111 on the latch tip is located directly below a pin 112 carried by the stem of the start key 20. Accordingly, when the start key 20 is depressed, the pin 112 will release the latch tip 99, allowing the bail 103 and void key to return to their normal positions. The start key 20 is also effective upon depression thereof to close a normally open switch 113 located in the tape punch circuitry (see also FIG. 38), conditioning the latter for operation.

The start key 20 is not effective to cause operation of the machine, but is effective to release any depressed amount keys. For this purpose, the pin 112 also overlies one end of a lever 114 (FIG. 15) fulcrummed on frame pin 115 and provided with an ear 116 (see also FIG. 16) underlying an arm of a bell crank 117 fulcrummed on a frame pin 118. The latter bell crank underlies the arms of two bell cranks 120 and 121, both pivoted on a frame pin 122 and pivotally connected at their lower ends to key release bars 123 and 124, respectively. The latter bars are supported at their opposite ends by somewhat similar bell cranks 125 and 126, respectively. The release bar 123 is provided with projections 123a lying directly in front of extensions on the key locking bails 37 associated with amount keys in the right hand keyboard section 14 (FIG. 1). The bar 124 is provided with projections 124a lying directly in front of the key latching bails associated with the amount keys in the left hand keyboard section 15. Accordingly, when the start key 20 is depressed to condition the machine for a new operation, the bell crank 117 will be rocked to shift both key release bars 123 and 124 to the right (in FIG. 16) to release any depressed amount keys.

The end-of-transaction key 31 (FIGS. 1, 11, 17, 18 and 19) is effective to cause operation of the machine to record the information indicated on line 31 of FIG. 37 and, for this purpose, its stem carries a pin 127 engageable with a camming surface 128 formed on an extension of the bail 103 whereupon depression of the key 31 will cam the bail counterclockwise to depress the total bar operated pin 85 and effect engagement of the main clutch 42.

Means (not shown) are provided for yieldably advancing the racks 11 during the first half of a machine cycle and for returning them to their illustrated home positions after a printing operation and during the latter half of the cycle. The racks are provided with slots 130 (FIG. 2 and 131 (FIG. 3) which are slideably guided over support shafts 77 and 132, respectively. The shaft 132 is slideably mounted in suitable guide slots (not shown) in the frame of the machine.

In order to yieldably advance the various racks, each rack has opposed notches 133 located at the closed end of its slot 131, the notches being normally engaged by rollers 134 carried by pawls 135 pivotally mounted on the shaft 132. A tension spring 136 extends between each pair of pawls whereby to urge the latter outwardly and thus hold the rollers 134 in drving engagement with the notches 133, thereby yeildably advancing any racks which are otherwise free to do so. When any of the racks 11 is arrested by a depressed amount key stem or by a zero block 40, the rollers 134 will ride out of the notches 133 of the blocked rack and along the edge of its slot 131.

The racks 11 are each operatively entrained with a respective one of a series of numeral printing wheels 137 (FIG. 2) forming part of the data printer 13. Each printer wheel is provided with a series of type characters spaced therearound and advancing in value from "0" to "9."

Each printer wheel is rotatably mounted on an individual arm 138 loosely keyed on a printer control shaft 140 and spring urged clockwise by a spring 141. A gear 142, integral with each printer wheel, is maintained in continual mesh with an idler 143, also carried by the arm 138.

Except during printing operations, the arms 138 are held in their illustrated positions by the shaft 140 wherein the idlers 143 mesh with associated idler gears 144 journaled on a fixed shaft 145. The latter idler gears continuously mesh with offset rack sections 146 integral with respective ones of the various racks 11.

During the mid-portion of a cycle, and after the various racks 11 have been advanced to different positions differentially limited by depressed ones of the amount keys, the shaft 140 is rocked clockwise, allowing the springs 141 to likewise rock the arms 138 (if otherwise allowed to do so), causing the printing wheels 137 to move into printing contact with a printing ribbon (not shown) and a paper strip T comprising a series of the aforementioned preprinted forms 22 (FIG. 37) arranged in end-to-end fashion, as the strip passes over a platen 147.

After printing is effected, the arms 138 are returned to their normal positions by the shaft 140 and the racks are subsequently returned to their home positions.

A special symbol rack 150 (FIG. 17) is provided and is entrained with a special symbol type wheel (not shown) similar to the numeral type wheels 137, to print symbols indicative of the type of operation performed by the machine. The symbol type wheel is located next to the group of numeral type wheels and is carried by an arm similar to the arms 138 and controlled by shaft 140.

The symbol type wheel is set by the rack 150 through a pair of intermeshing gears 151 and 152. The latter is fixed on a shaft 153 on which is fixed a similar gear (not shown) meshing with an idler similar to the idlers 144 (FIG. 2) which is entrained with the symbol print wheel.

The symbol rack 150 is provided with guide slots 154 and 155 embracing shaft 77 and a frame stud 156, respectively. The rack is yieldably driven to the left during each machine cycle by the aforementioned drive shaft 132 which engages a notch in a pawl 157 pivoted at 158 to the symbol rack and urged upwardly by a spring 160 so as to cause the rack to yieldably follow the shaft 132 until the latter is blocked under control of different ones of the control keys. For this purpose, shoulders 161, 162 and 163 are formed on the symbol rack which are arranged to be differentially arrested by pins 83, 84 and 86 underlying the subtotal, tax and minus keys, when the rack has advanced three, two and one increments, respectively. A blocking ear 164 on the rack 150 is arranged to limit against the lower end of the stem of the total key 28 when the latter is depressed and after the rack has advanced four increments.

The rack 150 will advance six increments as an incident to depression of the void key until a shoulder 165 thereon engages a stop ear 166 on a lever 167 which is normally held in its position illustrated by a spring 168.

The symbol rack will advance to its fullest extent of seven increments as an incident to depression of the end-of-transaction key 31 and, for this purpose, a pin 170 is fastened to the stem of the key 31 and is effective upon depression of this key to engage the upper edge of the lever 167, lowering the stop ear 166 out of the path of the shoulder 165, so that the rack may advance until the right hand end of the slot 155 strikes the frame stud 156.

During add operations the symbol rack will be blocked from moving from its illustrated home position by mechanism to be described later. In such position, the symbol type wheel will be ineffective to print a symbol.

Describing now the construction of the accumulator 14 (FIGS. 3 and 22 to 27), the latter is basically disclosed in the above Drake Patent No. 2,472,696 and reference may be had to said patent for a complete disclosure of details not specifically shown herein. However, the accumulator comprises three different sections (FIG. 22) as noted heretofore.

In general, the accumulator comprises a plurality of accumulator gears 173 independently mounted on an accumulator shaft 174. A second shaft 175 is provided, both shafts being mounted in bearings formed in a series of cross plates 176 rigidly held in spaced relation with each other by suitable interlocking combs 177 to form the accumulator unit.

Shafts 174 and 175 are guided for vertical movement, to likewise guide the accumulator unit, in vertically extending slots 178 and 179 formed in side frame plates, one of which is shown at 180 (FIG. 27).

For the purpose of raising the accumulator unit from its neutral position shown in FIGS. 3, 23 and 27 into its upper position shown in FIG. 4 wherein the accumulator gears 173 located in the right hand section 16 of the accumulator mesh with the upper rack gear sections 181 of the associated racks or lowering the unit wherein the gears 173 of section 16 mesh with rack gear sections 182, there is provided a box cam 183 (FIG. 20) pivoted on a frame pin 184 and having a cam groove 185 embracing a roller 189 rotatably mounted on one end of the accumulator shaft 174. A similar cam 183a embracing a roller 189a supports the opposite end of the shaft 174 and is suitably connected to cam 183 to move in concert therewith.

Rocking of the cam 183 to raise or lower the accumulator is controlled by different ones of the control keys in accordance with the type of operation to be performed, as will be described hereinafter.

Tens transfer mechanism is associated individually with the accumulator sections 16 and 17, there being no provision for transferring between such sections and no tens transfer mechanism is associated with the section 18.

Referring to FIGS. 22 and 26, the transfer mechanism for the four higher orders of section 16 and the two higher orders of section 17 comprises a transfer pawl 184 which surrounds its associated gear 173 and is pivoted at 185 on a cam follower lever 186. The latter is pivoted on the lower accumulator shaft 175 and is operated by an aligned one of a series of helically arranged transfer cams 187 keyed on a transfer shaft 188.

Pawl 184 is provided with three detent notches, like 190, the central one of which is normally engaged by a spring pressed centralizer 191 pivoted at 192 on the associated brace plate 176 and urged by spring 193 into detenting engagement with the pawl.

As each gear 173 is rotated in a clockwise (subtractive) direction from its "0" to "9" registering position, a transfer tooth 194 (FIG. 23) thereon engages an ear 195 on the pawl 184 associated with the next higher order, thereby rocking that pawl upwardly until the centralizer 191 engages the lower detent notch 190 of the pawl. In such conditioned position of the pawl 184, a tooth 196 thereon is located directly behind one of the teeth on the associated accumulator gear 173. During digitizing operation and when the accumulator is in its neutral position the transfer shaft 188 is rotated, causing the transfer cams 187 to actuate the cam followers 186 to advance all of the pawls 184. Therefore, the teeth 196 of any of those pawls which have been conditioned as mentioned above will engage and advance their associated accumulator gears 173 one tooth in a clockwise direction.

Likewise, during an additive entry operation when an accumulator gear is moved between its "9" and "0" position in a counterclockwise direction, the tooth 194 thereof will strike the ear 195 of the next higher order pawl 184, moving the latter into a lower position wherein actuating tooth 197 thereon will be located in a position to actuate the associated accumulator gear one increment in a counterclockwise or additive direction.

A special transfer pawl 184a (FIG. 25) is provided for the lowermost order of section 17 for a purpose hereinafter described. No transfer ear 195 is provided on the transfer pawl 184a. Accordingly, transfers will not be carried between sections 16 and 17.

Means are provided to rotate the transfer shaft 188 a partial revolution before digitizing action by the racks and to complete the revolution of the shaft during the latter half of the machine cycle and after the racks have digitized the accumulator gears 173. Referring to FIG. 4A, a mutilated gear 520 and a notched disc 521 are keyed in juxtaposition with each other on the cam shaft 43. The disc 521 has a notch 522 formed in the edge thereof in alignment with the teeth of gear 520. The gear is arranged to mesh with a wide pinion 523 rotatably mounted on a frame stud 524 and having its width extending across both the gear 520 and the disc 521. The portion of the pinion 523 in alignment with the gear 520 is fully toothed while the portion thereof which is in alignment with the disc 521 has a pair of adjacent teeth cut away to form a bearing surface 525 against which the periphery of the disc will ride during the major portion of the machine cycle whereby to prevent rotation of the pinion whenever the teeth of gear 520 are out of mesh with the pinion. The pinion 524 is continuously entrained with a gear 526 fixed on the transfer shaft 188 by an idler 527 journaled on a frame stud 528.

As shown, the teeth of gear 520 are normally in mesh with the pinion 523, i.e., when the machine is in full cycle condition. Accordingly, during approximately the first 20° of the machine cycle, as indicated in FIG. 40, the transfer shaft will be rotated sufficiently to cause the transfer cam 187b (FIG. 25) and the other cams associated with the transaction count section 17 to effect any tens transferring operations of their respective orders. Also, a control cam 187a (FIG. 24) will recede from its cam follower 215, as will be described later.

During the latter portion of the machine cycle, the transfer shaft 188 will again be actuated by the gear 520 to complete its rotation and in so doing, the cams 187 thereon associated with the accumulator section 16 will actuate their respective transfer pawls to effect any conditioned transfers.

As noted heretofore, amounts are never entered into the accumulator sections 17 and 18 through the racks but, during an end-of-transaction operation, amounts are transferred from such accumulator sections through the racks to be printed and also recorded in the punch unit. For this purpose, those racks 11a (FIG. 23) associated with accumulator sections 17 and 18 have no upper rack gear sections, i.e., 181, and in lieu of the integral lower rack sections, i.e., 182, pivoted rack sections 200 are provided. The latter are each pivoted at 201 to its associated rack and is urged downwardly by a spring 202 into engagement with a roller 203 carried by an arm 204 pivoted at 205 on the associated accumulator cross plate 176. The arm 204 has a cam surface engaging a roller 206 carried by a zero stop arm 207 keyed on the shaft 175.

During any operations initiated by a total, subtotal, void or end-of-transaction bar, shaft 175 is rocked counterclockwise in a manner to be described, moving all zero stop arms 207 in all orders of the machine to position zero stop ears 208 thereon in the paths of teeth 210 carried by the respective accumulator gears. In doing so, the rollers 206 in sections 17 and 18 cam the associated arms 204 upwardly to position the pivoted racks 200 in mesh with the accumulator gears 173.

*Means for holding racks in mesh*

The pivoted racks 200 are held in mesh with accumulator gears 173 throughout a complete cycle in totaling and subtotaling, void and end-of-transaction operations. For this purpose, an arm 211 (FIG. 24) carrying a stud 212 thereon is keyed on the shaft 175 and is urged counterclockwise by a spring 213, urging the same against a roller 214 which in turn engages the periphery of the cam 187a. The roller 214 is carried by a latch 215 pivotally mounted on the accumulator shaft 174 and urged by spring 213 against the stud 12.

Shortly after the start of the machine cycle and after the cam 187a has receded from engagement with roller 214, the shaft 175 is rocked counterclockwise allowing the latch 215 to rock clockwise and to drop behind the stud 212 and thereby hold the arm 211 and shaft 175 in their counterclockwise rocked positions throughout the major portion of the cycle, thereby, through the arms 207, holding all of the pivoted racks 200 in mesh with their respective gears. Toward the end of the cycle the transfer shaft 188 will complete its rotation thereby causing the cam 187a to release the latch 215 to permit the shaft 175 and its various zero stop arms 207 to return to their normal positions.

*Means for rocking the zero shaft*

Describing now the means for rocking the zero stop shaft 175 in response to depression of the total, subtotal, void and end-of-transaction keys, reference is had to FIGS. 12, 20 and 34. Two cams 216 and 78 are keyed in side by side relation on the drive shaft 43 and are normally engaged by cam followers 218 and 76, respectively. The latter are pivoted on the shaft 77 and held in engagement with the cams by tension springs 221 and 307, respectively. Each of the cams has a high dwell portion extending about one-half of its periphery and the cams are so arranged that their high dwell portions overlap each other.

During totaling operations initiated by the total, void or end-of-transaction bars, the cam followers are operated independently of each other and follow their respective cams. In subtotaling operations, however, initiated by the subtotal bar 24, the cam followers are connected as a unit during the last half of the cycle and are therefore both held in clockwise rocked positions throughout the last half of the cycle. For this purpose, a stud 223 is slideably mounted in a slot 224 in the cam follower 76 and is carried by one end of the link 225 pivotally connected at its opposite end to the arm 88a associated with a subtotal bar.

When the subtotal bar is depressed the stud 223 is moved forwardly to overlie a shoulder 226 on the cam follower 218. Therefore, during the first half of an ensuing cycle, the cam follower 218 will be rocked into a clockwise position by its cam 216 and during the second half of the cycle, the cam follower 220 will be held in a clockwise rocked position by its cam 78, causing the pin 223 to likewise hold the cam follower 218.

The pins 83 and 85 actuated by the subtotal and total bars, respectively, are connected to opposite ends of a cross head 227 (FIG. 12) which is connected at its center through a pin and slot connection 228 to a link 330. The latter is pivotally connected at 231 to a floating lever 232 which rests on a frame pin 233. The lever 232 is connected through a pin and slot connection 234 to an arm 235 which is keyed on the shaft 175 and urged in a clockwise direction by a tension spring 236. The lever 232 is provided with a shoulder 237 which is normally located below the path of a pin 238 carried by the cam follower 218. Upon depression of either the total or subtotal bar, the cross head link 227 will be rocked downwardly to rock the link 232 counterclockwise about the pin 233 sufficiently to position the shoulder 237 directly in front of the pin 238. Accordingly, at the start of the cycle, the cam follower 218 will be rocked clockwise shifting the link 232 to the left in FIG. 12, thereby rocking the shaft 175 to carry the various zero stop arms 207 into zero blocking relation with their respective accumulator gears 174.

*Means for raising and lowering the accumulator*

Means are provided for raising or lowering the accumulator to mesh the accumulator gears in section 16 with the upper or lower rack gear sections of the associated racks. For this purpose, the box cam 183 (FIG. 20) carries a pair of pins 240 and 241 located on opposite sides of the pivot pin 184. These pins are adapted to be selectively engaged by a hook member 242 pivotally connected at 242a to an upwardly extending arm of the cam follower 218. The hook member is connected through a pin and slot connection 243 to a lever 244 which is fulcrummed on the pivot pin 184 at its lower end and connected at its upper end to the aforementioned power slide 66 through a yieldable coupling, generally indicated at 245. The latter comprises two coupling link parts 246 and 246a arranged in side by side relation and each having a pair of inwardly facing tongues 247. A compression spring 248 is fitted in compression over the tongues of both parts to normally hold the link in its illustrated length whereby, through lever 244, to normally hold the hook 242 with a slot 250 therein in embracement with the pin 241. Accordingly, if the hook 242 were to be maintained in its illustrated lowered position during the succeeding cycle, the cam follower 218 would be effective, through the hook member to rock the cam 183 counter-clockwise to lower the accumulator into a subtractive relationship with the racks in the right hand section of the machine.

The hook member 242 is connected through a pin and slot coupling 253 to a bell crank 254 fulcrummed on frame pin 255 and connected through pin and slot connection 256 to an accumulator positioning control bar 257. The latter is suspended for fore and aft movement by links 258 pivoted on frame pins 260.

Normally during an add or tax entry operation initiated by depression of the add or tax bars, the power slide 66 will be advanced forwardly as described heretofore to cause engagement of the main clutch 42 (FIG. 11), and in so doing, the power slide will, through the yieldable coupling 245, rock the lever 244 counterclockwise to raise the hook member 242 into a position wherein a slot 261 therein embraces the pin 240 on the cam 183. Accordingly, when the cam follower 218 is rocked clockwise, it will, through the hook member 242, likewise rock the cam 183 to raise the accumulator into an addition relation relative to the racks in the right hand section of the machine.

It will be noted that the accumulator positioning control bar 257 is provided with blocking shoulders like shoulder 262 in alignment with the pins 83, 85 and 86 associated with the subtotal, total and minus bars, respectively. Therefore, when any of these bars is depressed, its associated pin will be positioned directly behind an aligned blocking shoulder, thus preventing the power slide 66 from raising the hook member 242 out of its subtractive controlling position during the succeeding cycle. In this case, the yieldable coupling will be merely compressed as the power slide 66 is advanced to cause engagement of the main clutch.

Means are provided under control of the hook member 242 and bell crank 254 for preventing movement of the symbol rack 150 (FIGS. 17 and 21) out of its home position during an add operation. For this purpose, a symbol block controlling bar 263, similar to bar 257, is provided, the latter being suspended by links 264 and 264a from frame pins 260. A spring 266 is tensioned between the bar 263 and bell crank 254 to normally maintain a shoulder 267 on the bar 263 against the pin 256 on the bell crank.

The link 264a is extended and provided with a cam slot 268 which guides a pin 270 on a symbol rack lock 271 which is pivoted on a frame pin 272.

When a machine cycle is initiated by depression of the add bar, the hook member 242 will be rocked upwardly as noted hereinabove, rocking the bell crank 254 counter-clockwise to remove the pin 256 from behind the shoulder 267 thereby permitting the spring 266 to draw the bar 263 to the right. The cam slot 268 will accordingly cam the symbol rack lock 271 upwardly between the teeth 273 to block the symbol rack 150 against forward movement, thereby preventing the rotation of the symbol printing wheel from its blank position.

It will be noted that a blocking shoulder 274 is formed on the bar 263 in alignment with the pin 84 associated with the tax bar. Accordingly, when the tax bar is depressed, the pin 84 will be positioned directly behind the blocking shoulder 274 to prevent locking of the symbol rack in its home position even though an add operation is entailed.

*Transaction counter section*

Describing now the transaction counter section 17 (FIGS. 22 and 25) of the accumulator, it should first be noted that the transaction counter section is never cleared during an operation and is always advanced one increment as an incident to each transaction. Also, it should be noted that during the last operation of the machine, incident to a particular transaction, i.e. a machine cycle initiated by depression of the end-of-transaction key 31, the transaction number is registered in the transaction counter section and is printed as indicated on line 31 on the form 22 of FIG. 37.

For this purpose the transfer pawl 184a located in the lowermost or units order of the section 17 is provided with a special ear 276 formed thereon.

Normally, the pawl 184a is merely reciprocated idly during the first part of the split tens transfer phase of a machine cycle by the transfer cam 187b. However, upon depression of the end-of-transaction key 31, a bail 277 (FIGS. 17 and 25), connected thereto through a pin and slot coupling 278, is rocked clockwise about its pivotal support 280 in the machine frame. A blocking projection 281 on the bail is thus brought into blocking relation with the ear 276 so that during the subsequent cycling of the machine during which the accumulator unit is lowered, the ear 276 will engage the blocking projection 281, thereby rocking the pawl 184a counter-clockwise about its pivotal connection to the cam follower 186a into a position wherein it will be effective to advance the associated accumulator gear one increment or count.

It will be noted that the cam 187b is effective to advance the transfer pawl 184a only at the beginning of the next cycle whereby it will not interfere with the subtotaling of the transaction counter during the end-of-transaction operation.

It should also be noted that the machine number and the section or department number are printed in the left-most orders of line 31 (FIG. 37) during the end-of-transaction operation. This data is set up on the four accumulator gears in the accumulator section 18. During an end-of-transaction operation, this information is merely subtotaled from these last noted gears by virtue of the pivoted racks 200 which are maintained in continual mesh with such gears during the entire advance and retraction of the associated racks in the same manner as the pivoted racks associated with the transaction count section 17.

During a totaling or subtotaling operation any depressed keys in the right hand section 16 of the keyboard are released by the lever 232 (FIG. 12). For this purpose, the lever 232 is connected by a link 530 to a key release lever 531 fulcrumed at 532 and having one portion thereof overlying the bell crank 125 (see also FIG. 16) which supports the left hand end of the key release bar for the locking bails 37 associated with the right hand section 16 of the keyboard. Accordingly, when the floating lever 232 is moved to the left at a beginning of a subtotal or total cycle, the bell crank 125 will be actuated, causing release of the locking bails 37. The latter locking bails associated with the right hand section 16 of the keyboard, are thus held out during the major portion of the cycle to permit advancing of the racks associated therewith to total out the accumulator section 16. However, during total and subtotal operations, those locking bails 37 associated with the racks which cooperate with accumulator sections 17 and 18 are left in their normal positions during section 16 forward rack movement, wherein their zero blocks 40 block their associated racks from movement, but the keys are released in latter part of the cycle in the conventional manner by the bell crank 117. However, upon depression of the end-of-transaction key 31 the projection 535 thereon which overlies the bell crank 126, actuates the key release bar 124 and the portion of the lever 531 overlying the crank 125 actuates the bar 123 to rock all of the key locking bails 37 to thus permit all racks to move under control of their associated accumulator gears.

Means are provided to enforce a totaling operation to thus clear the right hand section of the accumulator before an end-of-transaction operation can be initiated.

For this purpose, an interlock element 283 (FIGS. 17, 18 and 19) is pivotally supported on the pivot pin 104a and is yieldably held in either of its two positions by a detent 284 which is pivoted at 285 and urged into engagement with the interlock element by tension spring 286. In its normal position, the interlock element underlies the aforementioned pin 127 on the stem of the end-of-transaction key 31, preventing depression of the latter. A camming lever 287 is pivotally supported at 288 and is spring urged in a counterclockwise direction by a spring 290 to normally hold a pin 291 thereof at the bottom of a camming notch 292 formed in the stem of the total bar 28. Upon depression of the total bar, the interlock lever 287 is rocked clockwise causing an arm thereof to engage a pin 293 on the interlock element 283 to rock the latter into its position shown in FIG. 18 wherein it will permit depression of the key 31. During depression of the total bar, however, an arm of the camming lever 287 will be positioned directly below the pin 127, thereby preventing depression of the key 31 until the total bar has been returned to its undepressed position at the end of the cycle.

The end-of-transaction key, when depressed, is locked in such depressed condition and for this purpose a pin 537 is provided on the stem thereof which, when the key is depressed, passes below an inclined edge 538 of the clutch control bar 56. Since the key 31 also, through the bail 103, depresses the pin 85 associated with a total bar as mentioned heretofore, the clutch control bar 56 moves to the left, thereby trapping the key 31 in a depressed position wherein it will stay until subsequently released by depression of the start key 20.

It should be noted at this point that following the totaling operation to obtain the total amount of money to be paid, other amounts could be added into the accumulator by entering the same in the right hand section of the keyboard and depressing the add bar in the usual manner. Later, upon depressing the end-of-transaction key 31, a total will be printed of the amounts accumulated in the right hand section of the accumulator while the section number, transaction number, etc., are subtotaled out of the left hand section in the usual manner. Accordingly, it will be seen that the right hand section of the accumulator is always cleared as an incident to an end-of-transaction operation because the lever 531 will depress the crank 125.

It will be recalled that the clutch control bar 56 (FIGS. 11 and 34) actuates the trip latch 61 for the power slide 66 through a hook 60. During each cycle of the machine the hook is released from the pin 59 on the latch to permit the latter to latch the slide 66 after it is returned by the pin 79, while at the same time the clutch bar 56 is retained in its forward position to lock out and prevent the depression of all control bars. However, the hook 60 is normally permitted to return rearwardly to again engage the pin 59 at the end of the cycle except during certain operations controlled by the tape punch unit.

The hook 60 is provided with a pin 296 engageable by a camming lever 297 which is pivoted at 298 and normally held in its position illustrated in FIG. 34, by a tension spring 300 to hold a pin 301 in engagement with an arm 302 suitably fastened to the cam follower 76. As the cam follower 76 is rocked clockwise during the latter portion of each machine cycle, the arm 302 rocks the lever 297 counterclockwise to cam the hook 60 out of engagement with the pin 59. The engagement of the lever 297 with the pin 296 also holds the clutch bar 56 in a forward position until near the end of the cycle. Toward the end of the cycle, the cam follower 76 returns, permitting the lever 297 to normally reconnect the hook 60 with the pin 59 of the trip latch 61.

Means, however (controlled by the tape punch) are provided for preventing the initiation of a new machine cycle after a normal cycle is ended even though the latch 61 and the clutch bar 56 have been returned and engaged. For this purpose a second latch 303, somewhat similar to trip latch 61 is provided in juxtaposition with the latter. The latch 303 is coupled through a pin and slot connection 304 to one end of a lever 305 pivoted on a frame pin 306. The other end of the lever 305 is pivotally connected to one end of a link 307 pivotally connected at its other end to the armature 310 of a solenoid 311.

A spring 312 normally holds the above linkage in a condition to maintain the latching shoulder of latch 303 below the roller 65 on the power slide 66. However, whenever the solenoid 311 is energized, the latch 303 is rocked counterclockwise, positioning its latching shoulder in front of roller 65 to block operation of the power slide even though the latch 61 is released.

The various preprinted forms 22 (FIG. 37) are of fixed length and are provided with a heading 314 on which are included such data as the store name, customer's name and address, etc. For this reason, the entries comprising records of the merchandise number, amount, etc., must be printed below such heading section. In order to insure proper location of the latter information, means are provided to properly space the strip (forming such forms in end to end relationship) at the end of each transaction operation in readiness for recording a new transaction.

The strip T is supplied in fanfolded form (as shown in FIG. 2) and is supported in a box like container 315 suitably attached to the rear of the machine. The leading edge of the strip is guided under a roller 316 and through a guide chute 317 onto the periphery of the platen 147 from whence it is guided through a second chute 318. The latter terminates in a tear-off edge 320.

The platen is provided with spaced sprocket pins 321 (FIGS. 5, 7 and 31) around on end thereof whereby to positively drive the strip T of forms, the latter having a series of regularly spaced sprocket holes 319 (FIG. 37) along one edge thereof to fit over the pins 321.

Describing first the means for advancing the platen one line at a time as an incident to successive machine cycles, a ratchet wheel 322 (FIG. 32) is suitably secured to the platen and is engageable by a pawl 323 which is reciprocated once during each machine cycle to engage a tooth on the ratchet wheel and thereby advance the platen from one line to the next.

Describing now the means for advancing the strip T to register a new form in position for recording a new transaction, a second cyclically operable clutch 325 (FIG. 33) is provided. The latter is rotatably mounted on the shaft 43 but has no connection thereto.

The driven side of the clutch is suitably connected to a gear 326 meshing with a gear 327 which is driven through suitable coupling means (not shown) by the main motor 41 (FIG. 39) so as to rotate the clutch in a counterclockwise direction.

The clutch is controlled by a clutch dog 328 pivoted at 330 and normally held in its illustrated clutch disengaging position by a tension spring 331 attached to a lever 332 which is pivoted at 333 on a frame pin. When the clutch dog is rocked counterclockwise to cause engagement of the clutch, by means to be described later, it will, through the motor switch operating lever 332, effect closing of an auxiliary motor switch 336 (see also FIG. 39) located in the circuit for motor 41.

The driving side of the clutch 325 carries a stud 337 (see also FIG. 28) which normally lies in front of an ear on a bypass pawl 338 which is pivoted at 339 on a gear 340 and is normally spring held in its illustrated position by a spring 341 tensioned between the pawl and the gear.

The gear 340 is rotatably mounted on the shaft 43 and meshes with a gear 342 which is attached to a chain sprocket 343. The latter is effective to drive a chain 344 which, in turn, drives a sprocket 345 fastened to a hub 346 (see also FIG. 5) which is rotatably mounted on a platen shaft 347. Also attached to the hub 346 is a gear 348 (see also FIG. 29) which meshes with a gear 350 fixed on a cross shaft 351. A centralizer disc 352 attached to the gear 350 is engaged by a centralizer 353 pivotally supported at 354 and held in engagement with disc 352 by a tension spring 355 whereby to normally centralize the above noted drive mechanism in its illustrated position.

A gear 356 (see also FIG. 30) is secured to the shaft 351 and normally meshes with a gear 358 slideably keyed on a second platen supporting shaft 360.

A compression spring 361 is compressed between the ratchet wheel 322 and gear 358 to normally maintain the latter in its position shown whereby to establish the driving connection between the gear 340 and the platen.

Accordingly, when the form feed clutch 325 is engaged, the pin 337 thereon will effect the driving connection through the pawl 338 and aforementioned gearing to drive the platen to advance the form strip until the leading edge of the next succeeding preprinted form is located directly below the tear-off edge 320.

As various items of merchandise and their amounts are recorded along with other coded information, the platen is spaced by the line feed pawl 323 and therefore the gear 340 and bypass pawl 338 recede from engagement with drive pin 337 by different amounts depending on the number of lines in which information is recorded. Therefore, when the clutch 325 is energized near the end of an end-of-transaction operation (as will be described) the pin 337 will first move idly, with the clutch 325, until it picks up the pawl 338 to advance the gear 340, and consequently the platen, through the remainder of a revolution of gear 340 whereupon the leading edge of next form is aligned with a tear-off edge 320.

Means are provided to facilitate threading of the strip onto the platen and, in particular, to insure registration of the sprocket holes with the sprocket pins 321 on the platen. For this purpose, a threading sprocket 363 having sprocket pins 369 thereon is located in a position readily accessible through an opening 364 (FIGS. 1 and 2) in a machine cover 365. The sprocket is rotatably mounted on a frame pin 366 and is driven in time with the platen by a gear train comprising intermeshing gears 367 and 368, the former meshing with a gear 370 fixed to the sprocket 363 and the latter meshing with a gear 371 fixed to the platen shaft 347.

It will be seen on reference to FIG. 31 that the pins 369 in the sprocket 363 are so spaced and the relative sizes of the gear train is such that when the sprocket holes 319 in the strip are initially threaded over the pins of sprocket 363 it will be properly fed onto the pins 321 on the platen, the chute 317 acting as guide means to guide the tape between the sprocket and the platen.

Describing now the means for enabling manual feeding of the platen for initially threading the strip, a knob 368 is provided having a bore therein slideable over the left hand portion of the platen shaft 360. A driving connection is formed between the knob and the shaft comprising a pin 370 fixed in the shaft and engaged by an open ended slot 371 on the knob.

The outer portion 360a of the shaft 360 is reduced in diameter and embraced by correspondingly reduced portion 372 of the bore in the knob. A compression spring 373 is fitted over the shaft portion 360a and extends between shoulders on the shaft and in the bore 372 of the knob to urge the knob outwardly. However, a clutching device (generally indicated at 374) is provided to locate the knob in position along the shaft against the action of spring 373.

The clutching device 374 comprises a series of balls 375 loosely mounted in radially extending caging holes formed in a hollow plunger 376 slideable axially in the bore 372 of the knob. The balls are radially positioned normally, as in FIG. 5, about a conical formation 360b on a reduced end portion of the shaft 360.

A bore 376a in the plunger 376 has slideable therein a plug 377 having a conical end portion which is normally pressed against the outer end of the shaft portion 360b by a compression spring 378, thereby normally urging (FIGS. 5 and 7) the plunger 276 outwardly to cause the balls 375 to ride up the conical portion 360b of the platen shaft whereby to wedge the same against the inner bore 372 of the knob to hold the latter from being forced outwardly.

When it is desired to manually rotate the platen, without turning the shaft 351, as in threading a new strip T, the knob is pressed inwardly along the shaft 360 into its position shown in FIG. 8 wherein the end thereof which abuts the gear 358 moves the latter out of mesh with gear 356 against the action of spring 361. Release of manual endwise pressure against the knob will permit the clutching device 374 to again grip the knob to locate the same in this position against the combined action of springs 361 and 373.

After manual adjustment of the strip has been made, i.e., when the leading edge of the first preprinted form is aligned with the tear-off edge 320, the operator presses the plunger 376 inwardly with his finger, forcing the balls 375 to disengage the conical surface of the shaft portion 360b so as to release their grip on the interior of the bore 372 and permit the springs 361 and 373 to return the knob 368 outwardly to its normal position shown in FIGS. 1 and 7. Accordingly, the gear 358 will remesh with the gear 356.

It will be noted that the reduced portion of knob 368 extends through an opening in the cover 362 to permit manual rotation of the platen. If it is desired to remove the cover for servicing purposes, the plunger 376 is forced inwardly beyond the end face of the knob 368 by a pencil or similar tool 380 (FIG. 9), compressing the spring 378 until the balls 375 are removed from the conical portion 360b and thereby from gripping engagement with the inner bore 372 and into alignment with the larger bore of the knob. At this time, while holding the plunger 376 inwardly, the knob may be manually withdrawn as shown in FIG. 10 wherein the balls are shown forced outwardly by the wedging action of the plug 377.

The foregoing platen knob construction is disclosed in detail and claimed in the copending patent application of Scozzafava et al., Serial No. 648,354, filed on March 25, 1957, and since matured into Patent No. 2,843,245, issued on July 15, 1958.

Describing now the means for engaging the feed clutch 325 (FIG. 33) during an end-of-transaction operation, it will be recalled that the symbol rack 150 (FIG. 17) is advanced to its fullest extent of seven increments only during an end-of-transaction operation. Attached to the symbol rack operated shaft 153 is a notched disc 540 having a shoulder 541 thereon. The disc rotates counterclockwise as the symbol rack advances to an end-of-transaction representing position until the shoulder 541 snaps over an ear 542 on a hook 334. The latter is pivotally connected at 335 to an arm of the clutch dog 328. During the latter half of the machine cycle, the disc rotates clockwise as the racks are returned to their home positions and the shoulder 541 will pick up the hook 334, thereby rocking the clutch dog 328 to effect engagement of feed clutch 325. As the disc 540 continues to rotate the shoulder 541 will become disengaged from the hook so that the clutch dog will again effect disengagement of the feed clutch at the end of its cycle. The ear 542 is urged toward the disc by a spring 543.

During any operation other than an end-of-transaction operation, the disc 540 will not be rotated sufficiently to engage its shoulder 541 with the hook 332 and, consequently, the feed clutch will not be engaged.

Figure 6:
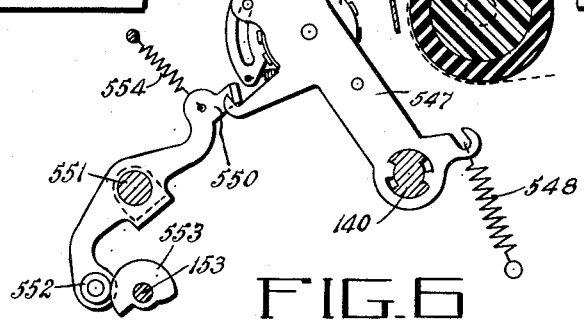
FIG. 6 is a sectional view through the date printing section of the printer.

It will be noted on reference to FIG. 37 that the date is printed on line 31 as an incident to an end-of-transaction operation. Referring to FIG. 6, a date printer device, generally indicated at 545, is provided, the latter comprising a series of independently settable date type wheels, one of which is shown at 546, all rotatably mounted on an arm 547 which is loosely keyed on the shaft 140 in a manner similar to the numeral printing wheel arms 138 of FIG. 2. The arm 547 is located along side the group of arms 138 and is spring urged toward the platen by a tension spring 548. Normally, however, the arm 547 is held in its illustrated position by a latch lever 550 which is pivotally supported at 551 and is provided with a roller 552 engageable with the periphery of a cam disc 553 fixed on the symbol rack operated shaft 153.

During all operations other than an end-of-transaction operation, the cam disc 553 maintains the latch lever 550 in latching engagement with the arm 547. However, whenever the symbol rack moves into its end-of-transaction indicating position, the cam disc 553 will permit a spring 554 to retract the arm 550 sufficiently to permit the arm 547 to follow the shaft 140 in a clockwise direction during the printing phase of the end-of-transaction cycle.

The date type wheels can be reached to change their settings through an opening 600 (FIG. 35) in the machine cover 365, the opening being normally covered by a door 601 suitably hinged to the cover.

Read-out device

In order to transmit information from the machine to the tape punch which is diagrammatically indicated at 19 (FIG. 39) a rack position sensing device, generally indicated at 401 (FIGS. 3, 4, 17 and 34) is provided. In general, the rack sensing device comprises in each order a brush slide 402 slideably mounted on studs 403 fixed to the associated rack. A spring 404 is tensioned between the slide and the rack and passes around a spool 405 rotatably mounted on the rack to normally retain the slide in its illustrated home position relative to the rack.

A contact bridging brush 406 is supported by each slide through a brush carrier 407 of insulating material. Each brush is split to form fingers 408 engageable with a contact plate assembly (generally indicated at 409). The latter comprises two superimposed plates 410 and 411 of insulating material carried by a base plate 412 (see also FIG. 34). Bonded to the upper surface of plate 410 are denominationally arranged feeder conductors 413 (see also FIG. 39) extending parallel to the links of the rack. These conductors are adapted to be engaged by certain of the fingers of the brushes 406. The remaining fingers of the brushes 406 are aligned with slots in the plate 410 and are movable over a series of transversely extending digital conductors 414 bonded to the upper surface of the plate 411 and electrically insulated from the strips 413.

Normally, when the machine is at rest, the contact plate assembly is held in its raised position shown in FIG. 3 wherein the brushes bridge respective ones of the column feeder strips 413 and certain of the digit conductors 414 depending upon the positions of the slides 402. Also, at this time, an aligner 415 carried by the contact plate assembly is held in engagement with certain of a series of locking teeth 419 of all of the slides to maintain the same in positions to which they were adjusted by the racks 11 during the preceding cycle.

At the start of a machine cycle and before the main racks are advanced, the contact plate assembly is lowered to its position shown in FIG. 4 and is held there until the main racks have advanced the brush slides to digitized positions. Before the main racks are returned from their digitized positions during the latter half of a cycle, the contact plate assembly is again raised to lock the slides in position and to electrically connect the various denominational conductor strips with certain of the digit conductors in accordance with the values registered by the racks. For this purpose, the plate 412 is provided with upstanding flanges at opposite ends thereof, one of which is shown at 416 (FIG. 34). Each flange is provided with vertical slots 417 guided over frame pins 418 which pivotally support arms 420. The latter are pivoted together through a pin and slot connection 421 at their inner ends and are connected through pin and slot connections 422 at their outer ends with the flanges 416 whereby to force parallel or vertical movement of the plate assembly.

In order to raise and lower the contact plate assembly, the latter is connected through bell cranks, one of which is shown at 423, fastened to a rock shaft 424 and connected through a link 425 to a cam follower 426. The latter is pivoted at 427 and engages the aforementioned cam 216, being held against the periphery thereof by a tension spring 428 connected at one end to a bell crank 423.

At the start of a machine cycle, the cam follower 426 drops off the high portion of cam 216, allowing the spring 428 to lower the contact plate assembly, permitting the slides 402 to be returned by springs 404 to their home positions relative to the racks (if they have been advanced by a prior machine cycle) and then permitting the racks to advance the slides to newly digitized positions. At approximately 190° in a cycle, the cam 216 will pick up the cam follower 426, thereby raising the contact plate assembly to establish electrical connections to the different digit strips depending upon the newly registered positions of the racks and again locking the slides in their advanced position while the racks 11 return to home position.

The cam 216 is also effective to close a start scan switch 430 located in the punch control circuitry. For this purpose, an extension 431 of the cam follower overlies the plunger of the switch. In full cycle position of a cam, the cam follower engages an intermediate lever portion 432 which is effective to maintain the switch 430 in open condition and yet hold the contact plate assembly in its upper raised location.

The tape punch unit 19 (FIG. 39) is disclosed in detail in the Blodgett patent No. 2,700,466, issued on January 25, 1955, and in the copending application of R. E. Boyden et al., Serial No. 513,365, filed June 16, 1955 (Patent No. 2,927,729 issued March 3, 1960), which application also discloses and claims the aforementioned rack position sensing device. Therefore, the punch will only be generally described herein.

The punch unit comprises a series of punches, like 433, slideably mounted in a guide block 434 and located in a line extending transversely across a paper tape 435. The tape is guided between the guide block 434 and a guide block 434a and is advanced one increment as an incident to each punch operation.

Each punch is conditioned for a punching operation by a respective electromagnet 436 and is actuated by a device 437 operated by a punch motor 438 through a normally disengaged clutch 440. The latter is engaged under control of a punch control magnet 441.

The punch operating device 437 is effective during a cycle of operation thereof to throw a single pole, double throw switch PLC from its normal position (shown in FIG. 39) to its alternate position and thereafter return the same during the latter half of the punch cycle.

Describing now the circuit connections for controlling the punch unit, it should be noted that a separate symbol information section is provided on the contact plate assembly 401 to obtain symbol code information from the symbol rack 150 (FIG. 17). This section comprises a brush slide 402a similar to the aforementioned slides 402, but carrying two brushes 443 and 444, similar to the construction of the brushes 406, and insulated from each other.

The brush 443 is effective to bridge a symbol conductor strip 445 and any of a number of symbol information strips 446 (FIG. 39) depending upon the position to which the symbol rack is advanced. Likewise, the brush 444 is effective to bridge a second symbol conductor strip 447 and any of a number of symbol information conductor strips 448.

A step switch, diagrammatically indicated at 450, is provided to successively pick off new information from the different denominations of the machine, as well as symbol information, and to transmit such information through a diode translating matrix, generally indicated at 451, in coded form to the various punches 433 of the punch unit.

In the example shown, an eight channel code is employed utilizing eight punches 433 and their control magnets 436 identified as "1," "2," "4," "8," "0," "X," "C," and "EL." The various digit conductors 414 are connected to the punch control magnets 436 through different combinations of diodes in the matrix 451 to punch different numerical code patterns for the different digits 0 to 9. For example, the number 5 digit conductor 414 is connected through line 452 and diodes 453, 454 and 455 to the punch magnet for punches "1," "4" and "C."

The step switch 450 is operated by an electromagnet 456 which is effective to advance a pawl 457 from one tooth to the next of a ratchet wheel 458 connected to the rotor of the switch. A spring 460 is effective upon deenergization of the magnet 456 to cause the pawl to advance the rotor from one contact step to the next.

The step switch includes two levels of contacts 461 and 462. The various pairs of contacts in each level are adapted to be bridged by two brushes, like brush 461a spaced fifteen contacts apart.

The step switch also includes a double lobed cam 463 effective when the switch is in its illustrated home position to open pairs of contacts 464 and 465.

Program of operation

It may be well to note at this time that operation of the machine and punch to perform a complete transaction is divided into four successive programs of operation. In order to enter the first of these programs, the start key 20 (FIGS. 1, 13, 14 and 15) is first depressed. The latter is effective through switch 113, as will be described later in detail, to energize a relay K3 (FIG. 38). The latter sets up certain circuitry and completes a circuit through a program lamp "1" (FIGS. 1, 36 and 38) indicating that the first program is in order. During such first program, the amounts and merchandise numbers of the different items of merchandise being sold are entered into the machine and thereafter the subtotal bar 24 is depressed to obtain a subtotal of the transaction for the purpose of computing any taxes, special charges, etc. The subtotal bar, upon depression, will cause energization of a relay K4 which sets up circuitry necessary to perform program "2" and also completes a circuit through program indicating lamp "2," indicating that the second program is in order. During the second program, the various taxes or special charges are entered by way of the tax bar or the add bar. Following this operation, the total bar is depressed which effects energization of relay K5. The latter sets up circuitry to perform program 3 and also completes a circuit through program lamp "3" indicating that program 3 is in effect. During this program, the sales person's number and type of transaction code number is entered and the add bar depressed. This causes relay K6 to be energized to set up circuitry for program number 4 and completes a circuit through the program lamp "4." During program 4, the end-of-transaction key 31 is depressed which energizes relay K7 to complete the transaction operation. After completion of the machine operation and printing line 31 (FIG. 37), the circuit through the lamp "4" will be opened and the apparatus returned to its normal condition.

Describing now the circuitry in more detail, the switch 113, upon being closed by the start switch 20, completes a circuit from a B plus supply 467, through relay contacts K6-8, K5-8, K4-3, switch 113, coil of relay K3 and resistor 468 to a ground line 470. Holding contacts K3-1 of relay K3 now establishes a holding circuit from the coil of relay K3, through contacts K3-1, K5-2 and K8-5 to a B plus supply.

Contacts K3-3 establish a circuit from a common line 471 for the program lights through the secondary winding of a transformer 472, contacts K6-10, K5-10, K4-5 and K3-3 to illuminate program lamp "1," indicating that the program 1 is in effect. The merchandise number and amount of the first item is now entered in the keyboard and the add bar 21 depressed. Accordingly, the main motor switch 82 (FIGS. 11 and 39) is closed, effecting a machine cycle. Directly after the cycle commences, the cam follower 218 (FIG. 34) is rocked counterclockwise by its cam 216 and in so doing, it picks up a roller 216a of an interlock switch operating bell crank 218a. A second roller 473 on the bell crank moves over a plunger arm 473a of a normally open interlock switch 474, see also FIG. 39, thereby completing a circuit through interlock solenoid 311 across a power circuit 475. The solenoid will now rock the latch 303 to block the power slide 66 from operating, even though latch 61 is rocked away from the roller 65 by the bar 56.

It should be noted that the roller 216a extends over the cam follower 76 whereby to hold the interlock switch closed throughout the major portion of the machine cycle, as indicated in the timing chart of FIG. 40.

The interlock switch 474 also completes a circuit through line 476 and the punch motor 438 across the power circuit.

At approximately 190°, the contact plate assembly 409 is raised causing the various brushes 406, 443 and 444 to bridge their respective denomination and symbol conductor strips with the different digit and symbol conductors.

At approximately 225°, the start scan switch 430 (FIGS. 34 and 39) closes completing a circuit from a B plus supply through the strip 447, brush 444, the plus conductor strip and line associated with conductor strip 447, point 478, normally closed contacts 479 of the PLC switch, point 1480, point 480, point 481, relay contacts K6-3, K5-4, the common line 492 for the lower fifteen contact pairs of the step switch level 461, brush 461b, point 482, relay contacts K8-6, K1-6, point 483, the "EL" (end of line code), punch control magnet, point 484, relay contacts K2-3, normally closed interrupter contacts 485 of the step switch 450, line 486 and relay contacts K2-5 to ground. Accordingly, the "EL" magnet will be energized. At the same time, a parallel circuit is completed from point 482 (FIG. 39), step switch brush 462b, line 1486, relay contacts K5-6 and K6-5, line 487 to the magnet 441 for the punch clutch 440. Accordingly, the punch will operate to punch an "end-of-line" code in the tape.

As the clutch operates, PLC contacts are thrown to their alternate setting, i.e., closing contacts 488 and completing a new circuit parallel to the above from point 478, line 1488 through contacts 488, point 489, relay contacts K8-3 and K1-5 through step switch coil 456 to ground, thereby advancing the step switch. As the PLC contacts return to their normal position, the circuit through the step switch coil 456 is broken, permitting the spring 460 to advance the pawl and rotor, moving the various step switch brushes into bridging relation with the contact pairs b and b'. The off-normal switch contacts 464 and 465 now close connecting B plus supply 491 through off-normal contacts 464 and point 478 to the transfer blade of the PLC contacts until the step switch contact is completed. Also, the off-normal contacts 465 maintain the punch motor circuit closed until the end of the step switch cycle.

At step b of the step switch, a circuit is completed from the transfer blade of PLC through contacts 479, point 1480, point 480, point 481, contacts K6–3, contacts K5–4, common line 492, step switch brush 461b, point 493, symbol conductor 445, bridging brush 443 and add symbol conductor through the zero digit conductor to the "0" punch control magnet whereby to punch a zero code.

The foregoing cycle of events will be repeated to successively advance the step switch each time the punch is operated and to operate the punch each time the step switch is advanced. At each successive step of the step switch from step c to n, digital information is picked off successively higher denominational orders of the machine and transferred through digit lines, i.e. 452, and the diode matrix 451 to appropriate ones of the punch magnets. The brush 462b will be effective in each step to energize the punch clutch control magnet 441 to effect the punching operation.

At step o, a circuit will be completed from common line 492, through brush 461b, point 494 and the diode matrix to punch an information code "2" and "8" and "X."

As the step switch homes at step o, the off-normal contacts 464 and 465 open to remove B plus from the step switch circuit and to stop the punch motor, thereby completing entry of the merchandise number and amount information in the punched tape.

Additional entries are made in the same manner and thereafter the subtotal bar 24 is depressed to print a subtotal. At this time, no circuits are completed through the punch controls or step switch. However, the symbol rack will move to its subtotal indicating position and a circuit is completed from the B plus supply through the start scan switch 430, symbol conductor 447, subtotal symbol conductor strip s, line 449, point 495, now closed relay contacts K3–2 and the coil of relay K4 to the ground line 470, thereby energizing relay K4. Relay contacts K4–2 now closes to apply B plus from point 495 to the upper end of the coil of relay K3, thereby shunting out this coil to permit its holding-contacts K3–1 to open. At the same time, holding-contacts K4–1 close to establish a holding circuit from the coil of K4, through K5–2 and K8–5 to B plus.

Contacts K4–4 now close to complete a circuit through the "2" program lamp.

During program "2," the taxes or special charges are entered in the keyboard and the add or tax bar is depressed to initiate a machine cycle. The interlock switch 474 starts operation of the punch motor and the start scan switch 430. The start scan switch 430 completes a circuit through the tax symbol or add conductor, depending upon the symbol position to which the symbol rack is advanced, through the "EL" punch control magnet and the punch clutch magnet 441 to punch an "end-of-line" code in the same manner as described above.

The ensuing operation of the step switch and punch is the same as that noted in program 1.

Following entry of the taxes and/or special charges, the total bar 23 is depressed. In this cycle, operation of the punch is suspended. However, the start scan switch 430 will complete a circuit from B plus, through symbol conductor 447, brush 444, total symbol conductor, line 1444, the coil of relay K5, and resistor 496 to the ground line 470, thereby energizing the relay K5. Contacts K5–2 now open to break the holding circuit from K4 and at the same time contacts K5–1 close to establish a holding circuit for K5. Contacts K5–9 now close to complete a circuit through the "3" program lamp.

At program 3, the sales person's number and type of transaction code are entered in the keyboard and the add bar is depressed, thereby causing the machine to cycle. The interlock switch 474 will, through line 476, complete a circuit through the punch motor 438 and the start scan switch 430 will connect B plus through symbol conductor 447, the add symbol strip, point 478, now closed contacts 479 of the PLC switch, points 1480, 480 and 481, contacts K6–3, now closed contacts K5–3, and point 497 to the common line 498 for the second set of step switch contacts a' to o'.

It will be noted that contacts K5–4 are now open to make the lower set of step switch contact pairs a to o ineffective. On the other hand, the upper contact pairs are connected only to the denomination conductor strips associated with the left hand side of the keyboard since information data only and not amounts are to be entered in the following programs 3 and 4.

As the circuit is completed from the start scan switch 430, as noted above, through line 498, the remainder of the circuit will be completed through brush 461a, point 500, K6–7 and the diode matrix 451 to punch an information code "2," "8" and "0." A parallel circuit will be completed from point 500 through brush 462a, common line 501, closed contacts K5–5, contacts K6–5 and line 487 to the punch control magnet 441. The punch will now operate and will control the step switch 450 to successively scan the pairs of contacts a' to o'. When the step switch reaches contacts i', a circuit will be completed through brush 461a, point 502, point 493, the symbol conductor strip 445, brush 443, plus symbol conductor and through the zero digit strip to punch an "0" code. Upon the next step of the step switch, a circuit will be completed from line 498 to contact pair j' and the coil of relay K2 to ground, energizing the relay K2. A locking circuit will now be completed for K2 through contacts K2–1, point 503, point 504, point 505, point 506 and off-normal contacts 464 to the B plus supply 491. Contacts K2–6 now apply B plus through contacts K7–3, point 508, K5–7 and point 509 to the upper end of the K5 coil to shunt out the latter relay. At the same time, B plus is applied from point 508 to the bottom of coil of relay K6, energizing the latter. Holding contacts K6–1 now close to establish a holding circuit from the relay K6 through contacts K8–5 to B plus supply.

As relay K2 is energized, it sets up a homing circuit for homing the step switch as follows: from ground to coil 456 of the step switch, contacts K1–5, K8–3, point 489, now closed contacts K2–2, step switch interrupter contacts 485, line 486, now closed contacts K2–4, point 503, point 504, point 505, point 506, and off-normal contacts 464 to the B plus supply 491. The step switch will now rapidly advance to its normal home position.

As the step switch reaches its home position, the off-normal contacts 464 open to drop relay K2. However, relay K6 remains energized.

Relay K6, upon being energized, also causes its contacts K6–9 to complete a circuit through the "4" program lamp indicating that the machine is in condition to progress through program 4.

In order to initiate program 4, the end-of-transaction key 31 is depressed causing the machine to again cycle to automatically print the date, section number and transaction number. As the symbol rack is advanced, the symbol brush 444 contacts the strip S.T. and thereby is set to represent an end-of-transaction operation. As the start scan switch 430 closes, it completes a circuit from a B plus supply, through brush 444, line 510 and coil of relay K7, thereby energizing the latter relay. The relay is held energized by the start scan switch until the step switch has advanced to its first step at which time the off-normal contacts 464 will close completing a circuit from the B plus supply 491 through contacts 464, point 506, point 505 and contacts K7–1 to the coil of relay K7 to hold the same energized. The symbol rack controlled symbol brush 443 is also set during such end-of-transaction operation of the machine to establish a conditioning circuit from point 502 on a step switch contact i', through symbol conductor strip 445, line 511 and diode matrix 451 to condition circuits for the "2" and "8" and "C" punch control magnets.

B plus is applied to the common line 498 of the section of the step switch containing pairs of contacts a' to o' throughout the end-of-transaction operation by virtue of the fact that relay K6 is still held energized. That is, a circuit is completed from line 498, through point 497, contacts K6–2, point 481, point 480, PLC contacts 479, point 478 and off-normal contacts 464 to B plus supply 491.

While in its initial setting, the brush 461a of the step switch completes a circuit through contacts a' from line 498, through point 500, contact K6–6, point 513 and punch control magnets for the punches "1," "2," "4," "8," "0," "X" and "C." The punch control magnet 441 will be also energized by its parallel circuit to punch the above code.

The punch operation will effect stepping of the step switch in the usual aforementioned manner. The information is picked off of successively higher denominational orders of the left hand section of the machine and transferred to appropriate ones of the punches during successive steps of a switch. As the brush 461a bridges a pair of contacts i', the aforementioned punch code conditioning circuit will be completed from line 498 through point 502 and brush 443 to the "2," "8" and "C" punch control magnets.

As the brush 461a bridges j', a circuit is completed from line 498, through contacts j' and the coil of relay K2, thereby energizing the latter. Contacts K2–6 now apply B plus through contacts K7–2 to the upper end of the coil of relay K7, thereby shunting out the latter relay.

Relay K2 is held up through a circuit including contacts K2–1, point 503, point 504, point 505, point 506, and the off-normal contacts 464 to the B plus supply 491. Accordingly, a homing circuit will be established for the step switch through the following circuit; from ground, through the coil stepping relay 456, contacts K1–5, contacts K8–3, point 489, contacts K2–2, interrupter contacts 485, line 486, contacts K2–4, point 503, point 504, point 505, point 506 and interrupter contacts 464 to B plus supply 491. Accordingly, step switch will now rapidly self-step itself through the remaining pairs of contacts k' to o'. At this time, the off-normal contacts open to break the circuit through relays K2 to K7 to allow the same to drop and thus return the circuitry to its normal condition.

In the event that the void key 32 is depressed as an incident to an erroneous entry into the machine or the like, a machine operation will ensue to clear out the accumulator, and the symbol brush 444 will be advanced to bridge the symbol conductor 447 with the "void" symbol conductor. Therefore, a circuit will be completed by the start scan switch 430 from the B plus supply through brush 444, the "void" contact strip and its connected line and through the coil of relay K8 to energize the same. Contacts K8–5 now break to open the holding circuits of any other relays that may be held up at that time. Contacts K8–2 now complete a circuit through the diode matrix 451 to set up a void indicating code wherein punch control magnets for the "1," "2," "4," "8" and "X" punches are energized. Also, contacts K8–3 open to break the circuit through the coil 456 of the step switch, thereby insuring that the latter does not move from its home position during a void operation.

In the event it is desired to feed tape through the punch independently of control by the machine, a tape feed switch 520 is closed completing a circuit from B plus supply 521 through the coil of relay K1. Contacts K1–2 now close to complete a circuit from one side of the main power circuit 475, through line 476 to the punch motor 438, connecting the same across the power circuits. Contacts K1–1 supply B plus from source 521 through switch 520, point 481, contacts K6–3, contacts K5–4, line 492, brushes 461b and 462b, line 1486, contacts K5–6, contacts K6–5, line 487 through the punch control magnet 441.

The machine may be operated as an adding machine by depressing first the start key 20 and then the total bar 28. Following this, amounts may be entered and totaled in the usual manner without entering such amounts into the punched tape.

Although we have described our invention in detail and have therefore used certain terms and languages herein, it is to be understood that the present disclosure is illustrative rather than restrictive and that changes and modifications may be made without departing from the spirit or scope of the invention as set for in the claims appended hereto.

Having thus described our invention, what we desire to secure by United States Letters Patent is:

1. In a sales transaction registering apparatus, the combination comprising an accumulator including a plurality of ordinally arranged gears; a plurality of actuators for actuating respective ones of said gears, said actuators being mounted for fore and aft movement relative to said apparatus, certain of said actuators having upper and lower rack gear sections located respectively above and below respective ones of said gears, means for raising said accumulator to an upper position to mesh said gears with said upper rack sections and for lowering said accumulator to a lower position to mesh said gears with said lower rack sections whereby to cause said certain racks to drive said respective gears in one direction or the other, others of said racks having single rack sections operatively connected therewith, and means for maintaining said single rack sections in mesh with respective ones of said gears in different said positions of said accumulator.

2. The combination according to claim 1 comprising means for selectively enabling and disabling said last mentioned means.

3. In a sales transaction registering apparatus, the combination comprising an accumulator including ordinally arranged gears; actuators for actuating respective ones of said gears, said actuators being mounted for fore and aft movement relative to said apparatus, certain of said actuators having upper and lower rack gear sections located respectively above and below respective ones of said gears, means for raising said accumulator to an upper position to mesh said gears with said upper rack sections and for lowering said accumulator to a lower position to mesh said gears with said lower rack sections whereby to cause said certain racks to drive said gears in one direction or the other, others of said racks having single rack sections operatively associated therewith, normally ineffective zero stop devices operatively associated with all of said gears, means for rendering said zero stop devices effective, and means controlled by said last mentioned means for maintaining said single rack sections in mesh with respective ones of said gears in different said positions of said accumulator.

4. In a sales transaction registering apparatus, the combination comprising an accumulator including ordinally arranged gears; actuators for actuating respective ones of said gears, said actuators being mounted for fore and aft movement relative to said apparatus, said actuators having rack gear sections, means for moving said accumulator from one position wherein certain of said gears are in mesh with respective ones of said rack gear sections to a second position wherein said certain gears are out of mesh with said respective rack gear sections, and means for maintaining others of said rack gear sections in mesh with respective ones of said gears in different said positions of said accumulator.

5. In a sales transaction registering apparatus, the combination comprising an accumulator including ordinally arranged gears; actuators for said gears, said actuators being mounted for fore and aft movement relative to said apparatus, rack gear sections on said actuators, means for moving said accumulator from one position wherein certain of said gears are in mesh with respective ones of said rack gear sections to a second position wherein said certain gears are out of mesh with said respective rack gear sections, normally ineffective zero stop devices operatively associated with all of said gears, means for rendering said zero stop devices effective, and means controlled by said last mentioned means for maintaining said rack sections associated with respective ones of others of said gears in mesh in different said positions of said accumulator.

6. In a sales transaction registering apparatus, the combination comprising an accumulator including ordinally arranged gears, said gears being arranged in an amount group and an item count group, said actuators being mounted for fore and aft movement relative to said apparatus, rack gear sections on said actuators, means for moving said accumulator from one position wherein said amount group gears are in mesh with respective ones of said rack gear sections to a second position wherein said certain gears are out of mesh with said respective rack gear sections, and means for maintaining said item count group gears in mesh with respective ones of said rack gear sections in said different positions of said accumulator.

7. In a sales transaction registering apparatus, the combination comprising an accumulator including ordinally arranged gears; said gears being arranged in an amount group and an item count group, said actuators being mounted for fore and aft movement relative to said apparatus, rack gear sections on said actuators, means for moving said accumulator from one position wherein said amount group gears are in mesh with respective ones of said rack gear sections to a second position wherein said certain gears are out of mesh with said respective rack gear sections, means independent of said actuators for entering items into said item count group, normally ineffective zero stop devices operatively associated with all of said gears, means for rendering said zero stop devices effective, and means controlled by said last mentioned means for maintaining said item count group gears in mesh with respective ones of said rack gear sections in different said positions of said accumulator.

8. In a sales transaction registering apparatus, the combination comprising an accumulator including a plurality of ordinally arranged gears; a plurality of actuators for actuating respective ones of said gears, printing mechanism operatively associated with said actuators for printing amounts entered into or removed from said accumulator by said actuators, and means for concomitantly causing certain of said actuators to total out of their respective ones of said gears and for causing certain others of said actuators to subtotal out of their respective ones of said gears.

References Cited in the file of this patent
UNITED STATES PATENTS

| | | |
|---|---|---|
| 1,003,086 | Barrett | Sept. 12, 1911 |
| 1,016,276 | Kilpatrick | Feb. 6, 1912 |
| 2,261,341 | Crosman | Nov. 4, 1941 |
| 2,284,786 | Williams | June 2, 1942 |
| 2,490,373 | Page et al. | Dec. 6, 1949 |
| 2,565,295 | Booten | Aug. 21, 1951 |
| 2,656,976 | Goleman | Oct. 27, 1953 |
| 2,682,994 | Boyden et al. | July 6, 1954 |
| 2,698,139 | Goodbar et al. | Dec. 28, 1954 |
| 2,731,206 | Lippert et al. | Jan. 17, 1956 |
| 2,756,823 | Laville et al. | July 31, 1956 |
| 2,840,217 | Nelson et al. | June 24, 1958 |